United States Patent
Harel et al.

(10) Patent No.: US 7,808,380 B1
(45) Date of Patent: Oct. 5, 2010

(54) INDICATOR PROCESSOR

(75) Inventors: Ziv Harel, Yokneam Ilit (IL); Tomer Carmeli, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 2143 days.

(21) Appl. No.: 10/650,778

(22) Filed: Aug. 29, 2003

(51) Int. Cl.
*B60Q 1/00* (2006.01)

(52) U.S. Cl. .................. 340/540; 340/500; 340/286.02; 340/679

(58) Field of Classification Search .................. 340/540, 340/500, 506, 517, 521, 525, 286.02, 815.4, 340/815.45, 679
See application file for complete search history.

(56) References Cited

U.S. PATENT DOCUMENTS

| | | | |
|---|---|---|---|
| 3,675,204 A * | 7/1972 | Miehle et al. | 340/525 |
| 5,598,418 A | 1/1997 | Lo et al. | |
| 5,706,210 A * | 1/1998 | Kumano et al. | 709/224 |
| 6,243,020 B1 | 6/2001 | Lam et al. | |
| 6,483,849 B1 | 11/2002 | Bray et al. | |
| 6,502,132 B1 * | 12/2002 | Kumano et al. | 709/224 |
| 6,564,161 B1 | 5/2003 | Lin et al. | |
| 2003/0128126 A1 * | 7/2003 | Burbank et al. | 340/605 |

* cited by examiner

*Primary Examiner*—Toan N Pham

(57) ABSTRACT

A system for customizing indicator information for displaying status information to a user includes a receiver for receiving status information from each of a plurality of devices, and assigning the status information to one of a plurality of classes to generate class information. Each of the plurality of classes is associated with a different characteristic of the plurality of devices. The system includes a plurality of manipulators for altering attributes of the class information for at least one of the plurality of classes. The system includes a logical combiner for combining class information into a plurality of combinational groups to customize the content of indicator information in each of the plurality of combinational groups, each combinational group formed according to a predetermined function. The system can include an information sequencer for modifying the order of indicator information from the plurality of combinational groups to generate a stream of indicator information.

136 Claims, 8 Drawing Sheets

INDICATOR PROCESSOR

BACKGROUND

1. Field of the Invention

The present invention relates to displaying status information of conditions in a system. More particularly, the present invention relates to a system and method of customizing indicator information for displaying the status information to a user.

2. Background Information

Many electronic systems, such as data networks, have displays that indicate the status of conditions in the system. For example, in data networks, such as Ethernet networks, the display is used to indicate the status of certain conditions, such as whether there is activity at a certain port of a network switch, whether there is transmit or receive activity at a port, the indication of a collision of data frames, and the like. In other types of systems, such as telephonic communication devices, displays may be used to indicate the status of battery power, the signal strength, activity on the line, and the like. One of the most common display devices in electronic systems is a Light Emitting Diode (LED) display.

In most instances, a user may be interested in only a subset of the different conditions of the system. For example, in an Ethernet network, although there may be available status information related to the conditions of the link, full-duplex, receive, transmit, collision, and the like, a user may only be interested in information regarding the collision and the activity on ports of the network. A user of another network may only be interested in the transmit and receive activity on the network ports.

Conventionally, users must use a network switch or other device that displays information on all of the conditions, which can be unreasonable. Alternatively, the user can attempt to purchase a network switch or device that provides the status of the desired conditions. However, expensive and complex external logic may be needed to manipulate the data stream to the LED display to tailor the LED display to the requirements of the user. Thus, a user can find it difficult to receive the information regarding the system conditions that the user particularly desires and at low cost and with low complexity.

SUMMARY OF THE INVENTION

A system and method are disclosed for customizing indicator information for displaying the status information to a user. In accordance with exemplary embodiments, according to a first aspect of the present invention, the system includes a receiver for receiving status information from each of a plurality of devices. The receiver assigns the status information received from each of the plurality of devices to one of a plurality of classes to generate class information for each of the plurality of classes. Each of the plurality of classes is associated with a different characteristic of the plurality of devices. The system includes a plurality of manipulators for altering at least one attribute of the class information for at least one of the plurality of classes. The system includes a logical combiner for combining class information from the plurality of classes into a plurality of combinational groups to customize a content of indicator information in each of the plurality of combinational groups. Each of the plurality of combinational groups is formed according to a predetermined function. The system can also include an information sequencer for modifying an order of indicator information from the plurality of combinational groups to generate a stream of indicator information. The order of information in the stream of indicator information can be modified to customize a display of the stream of indicator information.

According to the first aspect, the system includes a display for displaying the status information of the plurality of devices to the user using the stream of indicator information. The display can comprise a multiple element display. According to an exemplary embodiment of the first aspect, the multiple element display can comprise a plurality of individual light-emitting diodes (LEDs). The plurality of devices can include ports of a communication device. According to an exemplary embodiment, the communication device can include a network switch. For example, for the ports of a network switch, the characteristic of the plurality of devices can include at least one of a port speed, one of full duplex and half duplex, one of communications link up and down, port activity, port disabled, packet collision, and erroneous frame receiving.

According to the first aspect, the system includes an information stretcher for stretching the status information received from at least one of the plurality of devices by a predetermined amount. According to an exemplary embodiment of the first aspect, the receiver disables use of at least one of the plurality of classes upon occurrence of an event. For example, the event can comprise a communications link being down, a collision associated with information communication, or the like. Additionally, an attribute of the class information includes at least one of forced, inversion and blinking. The forced attribute of the class information substitutes information specified by the user for the class information. The system can include a plurality of blinking mechanisms configured to cause blinking of the indicator information. Each of the plurality of blinking mechanism is associated with a duty cycle and a rate. At least one class of the plurality of classes can be associated with one of the plurality of blinking mechanisms. All classes associated with a blinking mechanism can blink at the duty cycle and rate specified for the blinking mechanism. According to an exemplary embodiment of the first aspect, the predetermined function can comprise a logical AND of a first value with a second value to generate a first result, a logical AND of a third value with a fourth value to generate a second result, and a logical OR of the first result with the second result to generate a combinational group.

According to an exemplary embodiment of the first aspect, the information sequencer orders the stream of indicator information according to class, combinational group or device. The information sequencer can comprise a serializer for generating a serial stream of bits of indicator information from the stream of indicator information. The serializer can comprise a synchronizer for synchronizing different serial streams of bits of indicator information to synchronize a blinking rate of information included in different serial streams of bits of indicator information. The system according to the first aspect can also include a serial-to-parallel converter for converting the serial stream of bits of indicator information to parallel streams of indicator information. The parallel streams of indicator information are used for displaying the status information of the plurality of devices. According to an exemplary embodiment, the information sequencer can comprise a selector for selecting a portion of the serial stream of bits of indicator information to display a subset of the status information to the user. The selector can control the length of the serial stream of bits of indicator information by altering the start and the end of the serial stream of bits of indicator information to generate a frame of indicator information. The frame of indicator information comprises a portion of indicator information included in the serial stream of bits of indicator information.

According to a second aspect of the present invention, a system for customizing indicator information for displaying status information to a user includes a receiver means for receiving status information from each of a plurality of devices. The receiver means assigns the status information received from each of the plurality of devices to one of a plurality of classes to generate class information for each of the plurality of classes. Each of the plurality of classes is associated with a different characteristic of the plurality of devices. The system includes a plurality of manipulator means for altering at least one attribute of the class information for at least one of the plurality of classes. The system includes a logical combiner means for combining class information from the plurality of classes into a plurality of combinational groups to customize a content of indicator information in each of the plurality of combinational groups. Each of the plurality of combinational groups is formed according to a predetermined function. The system can also include an information sequencer means for modifying an order of indicator information from the plurality of combinational groups to generate a stream of indicator information. The order of information in the stream of indicator information can be modified to customize a display of the stream of indicator information.

According to a third aspect of the present invention, a method of customizing indicator information for displaying status information to a user includes the steps of: i.) receiving status information from each of a plurality of devices; ii.) assigning the status information received from each of the plurality of devices to one of a plurality of classes to generate class information for each of the plurality of classes, wherein each of the plurality of classes is associated with a different characteristic of the plurality of devices; iii.) altering at least one attribute of the class information for at least one of the plurality of classes; and iv.) combining class information from the plurality of classes into a plurality of combinational groups to customize a content of indicator information in each of the plurality of combinational groups, wherein each of the plurality of combinational groups is formed according to a predetermined function. According to the third aspect, the method can also include the step of: v.) modifying an order of indicator information from the plurality of combinational groups to generate a stream of indicator information, wherein the order of information in the stream of indicator information can be modified to customize a display of the stream of indicator information.

According to the third aspect, the method can also include the step of: vi.) displaying the status information of the plurality of devices to the user using the stream of indicator information. The stream of indicator information can be displayed to the user on a multiple element display to display the status of the plurality of devices to the user. According to an exemplary embodiment, the multiple element display can include a plurality of individual light-emitting diodes (LEDs). Additionally, the plurality of devices can include ports of a communication device. For example, the communication device can include a network switch. According to an exemplary embodiment, for the ports of a network switch, a characteristic of the plurality of devices can include at least one of a port speed, one of full duplex and half duplex, one of communications link up and down, port activity, port disabled, packet collision, and erroneous frame receiving.

According to the third aspect, the method can include the steps of: vii.) stretching the status information received from at least one of the plurality of devices by a predetermined amount; and viii.) disabling use of at least one of the plurality of classes upon occurrence of an event. For example, the event can comprise a communications link being down, a collision associated with information communication or the like. According to exemplary embodiments, an attribute of the class information includes at least one of forced, inversion and blinking. For example, the forced attribute of the class information substitutes information specified by the user for the class information.

The method according to the third aspect can also include the step of: ix.) associating at least one class of the plurality of classes with one of a plurality of blinking mechanisms configured to cause blinking of the indicator information, each of the plurality of blinking mechanism associated with a duty cycle and a rate, and wherein all classes associated with a blinking mechanism blink at the duty cycle and rate specified for the blinking mechanism. According to an exemplary embodiment, the predetermined function comprises a logical AND of a first value with a second value to generate a first result, a logical AND of a third value with a fourth value to generate a second result, and a logical OR of the first result with the second result to generate a combinational group.

According to the third aspect, the step of modifying can comprise the steps of: x.) synchronizing different streams of indicator information to synchronize a blinking rate of information included in different streams of indicator information; and xi.) ordering the stream of indicator information according to one of class, combinational group and device. The third aspect can also include the step of: xii.) generating a serial stream of bits of indicator information from the stream of indicator information. The step of generating can include the steps of: xiii.) converting the serial stream of bits of indicator information to parallel streams of indicator information, wherein the parallel streams of indicator information are used for displaying the status information of the plurality of devices; and xiv.) selecting a portion of the serial stream of bits of indicator information to display a subset of the status information to the user. According to an exemplary embodiment of the third aspect, the step of selecting can comprise the step of xv.) controlling a length of the serial stream of bits of indicator information by altering a start and an end of the serial stream of bits of indicator information to generate a frame of indicator information, wherein the frame of indicator information comprises a portion of indicator information included in the stream of indicator information.

According to a fourth aspect of the present invention, a system for customizing indicator information for displaying status information to a user comprises a memory that stores the steps of a computer program to: i.) receive status information from each of a plurality of devices; ii.) assign the status information received from each of the plurality of devices to one of a plurality of classes to generate class information for each of the plurality of classes, wherein each of the plurality of classes is associated with a different characteristic of the plurality of devices; iii.) alter at least one attribute of the class information for at least one of the plurality of classes; and iv.) combine class information from the plurality of classes into a plurality of combinational groups to customize a content of indicator information in each of the plurality of combinational groups, wherein each of the plurality of combinational groups is formed according to a predetermined function. According to the fourth aspect, the memory can also store the step of: v.) modify an order of indicator information from the plurality of combinational groups to generate a stream of indicator information, wherein the order of information in the stream of indicator information can be modified to customize a display of the stream of indicator information. The system according to the fourth aspect also includes a processor for accessing the memory to execute the computer program.

According to a fifth aspect of the present invention, a system for customizing indicator information for displaying status information to a user comprises a memory means for storing the steps of a computer program to: i.) receive status information from each of a plurality of devices; ii.) assign the status information received from each of the plurality of devices to one of a plurality of classes to generate class information for each of the plurality of classes, wherein each of the plurality of classes is associated with a different characteristic of the plurality of devices; iii.) alter at least one attribute of the class information for at least one of the plurality of classes; and iv.) combine class information from the plurality of classes into a plurality of combinational groups to customize a content of indicator information in each of the plurality of combinational groups, wherein each of the plurality of combinational groups is formed according to a predetermined function. According to the fifth aspect, the memory means can also store the step of: v.) modify an order of indicator information from the plurality of combinational groups to generate a stream of indicator information, wherein the order of information in the stream of indicator information can be modified to customize a display of the stream of indicator information. The system according to the fifth aspect also includes a processor means for accessing the memory to execute the computer program.

According to a sixth aspect of the present invention, a computer program for customizing indicator information for displaying status information to a user performs the steps of: i.) assigning the status information received from each of a plurality of devices to one of a plurality of classes to generate class information for each of the plurality of classes, wherein each of the plurality of classes is associated with a different characteristic of the plurality of devices; ii.) altering at least one attribute of the class information for at least one of the plurality of classes; and iii.) combining class information from the plurality of classes into a plurality of combinational groups to customize a content of indicator information in each of the plurality of combinational groups, wherein each of the plurality of combinational groups is formed according to a predetermined function. According to the sixth aspect, the computer program can also perform the step of: iv.) modifying an order of indicator information from the plurality of combinational groups to generate a stream of indicator information, wherein the order of information in the stream of indicator information can be modified to customize a display of the stream of indicator information.

According to a seventh aspect of the present invention, a system for customizing indicator information for displaying status information to a user includes means for receiving status information from each of a plurality of devices. The system includes means for stretching the status information received from at least one of the plurality of devices by a predetermined amount. The system includes means for assigning the status information received from each of the plurality of devices to one of a plurality of classes to generate class information for each of the plurality of classes. Each of the plurality of classes is associated with a different characteristic of the plurality of devices. The system includes means for altering at least one attribute of the class information for at least one of the plurality of classes. The system includes means for combining class information from the plurality of classes into a plurality of combinational groups to customize a content of indicator information in each of the plurality of combinational groups. Each of the plurality of combinational groups can be formed according to a predetermined function. The system includes means for modifying an order of indicator information from the plurality of combinational groups to generate a stream of indicator information. The order of information in the stream of indicator information can be modified to customize a display of the stream of indicator information. The stream of indicator information can comprise a serial stream of bits of indicator information. The system includes means for converting the serial stream of bits of indicator information to parallel streams of indicator information. The parallel streams of indicator information are used for displaying the status information of the plurality of devices. The system also includes means for displaying the status information of the plurality of devices to the user using the parallel streams of indicator information.

According to the seventh aspect, an attribute of the class information includes at least one of forced, inversion and blinking. For example, the forced attribute of the class information can substitute information specified by the user for the class information. The system can include a plurality of means for blinking configured to cause blinking of the indicator information, with each of the plurality of means for blinking associated with a duty cycle and a rate, and means for associating at least one class of the plurality of classes with one of the plurality of means for blinking. All classes associated with a means for blinking blink at the duty cycle and rate specified for the means for blinking. The system can include means for synchronizing different serial streams of bits of indicator information to synchronize a blinking rate of information included in different serial streams of bits of indicator information. The system can include means for ordering the serial stream of bits of indicator information according to one of class, combinational group and device. The system can also include means for controlling a length of the serial stream of bits of indicator information by altering a start and an end of the serial stream of bits of indicator information to generate a frame of bits of indicator information. The frame of bits of indicator information selects a portion of the serial stream of bits of indicator information to display a subset of the status information to the user. The frame of bits of indicator information comprises a portion of indicator information included in the serial stream of bits of indicator information.

According to an eighth aspect of the present invention, a system for customizing indicator information for displaying status information to a user includes a receiver for receiving status information from each of a plurality of devices. The receiver assigns the status information received from each of the plurality of devices to one of a plurality of classes to generate class information for each of the plurality of classes. Each of the plurality of classes is associated with a different characteristic of the plurality of devices. The system includes an information stretcher for stretching the status information received from at least one of the plurality of devices by a predetermined amount. The system includes a plurality of manipulators for altering at least one attribute of the class information for at least one of the plurality of classes. The system includes a logical combiner for combining class information from the plurality of classes into a plurality of combinational groups to customize a content of indicator information in each of the plurality of combinational groups. Each of the plurality of combinational groups can be formed according to a predetermined function. The system includes an information sequencer for modifying an order of indicator information from the plurality of combinational groups to generate a stream of indicator information. The order of information in the stream of indicator information can be modified to customize a display of the stream of indicator information. The stream of indicator information can comprise a serial stream of bits of indicator information. The system includes a serial-to-parallel converter for converting the serial stream of bits of indicator information to parallel streams of indicator information. The parallel streams of indicator information are used for displaying the status information of the plurality of devices. The system also includes a display for displaying the status information of the plurality of devices to the user using the parallel streams of indicator information.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a system and method for customizing indicator information for displaying status information to a user. According to exemplary embodiments, a user can customize both the content and layout of information used to display the status of a system to a user, so that the display of the status information meets the needs and requirements of the user. According to exemplary embodiments, the status information from a device or devices is organized into a plurality of classes, where each class represents a particular characteristic of the device or devices. For example, for ports of a network switch, such as an Ethernet switch, the characteristics can be speed, activity and the like. The user can choose to manipulate attributes of the information output from any or all of the classes, such as, for example, by inverting the information, substituting the information for other information, or causing the information to blink. The information from the classes can then be logically combined into different combinational groups, using a predetermined function, in a manner chosen by the user to customize the content of the logically combined information to the needs and requirements of the user. Additionally, the user can choose the order of the logically combined information to further customize the display of the information. The resulting stream of indicator information can be used to display the status information of the device or devices in a manner that is relevant and meaningful to the user.

As used herein, "indicator information" is any type of data that can indicate the state, condition, status, characteristics, or the like about an electronic device or devices. For example, the indicator information can be comprised of a series of bits, with each bit representing, for example, status information of a specific characteristic of the device or devices. For example, the devices can be the ports of a network switch or the like. The stream of bits that can comprise the indicator information can be used, for example, to illuminate Light Emitting Diodes (LEDs) according to desired patterns to visually communicate the status of the ports of the network switch to the user. However, the indicator information can be used to display any desired information about any electronic device or devices to a user.

Figure 1:
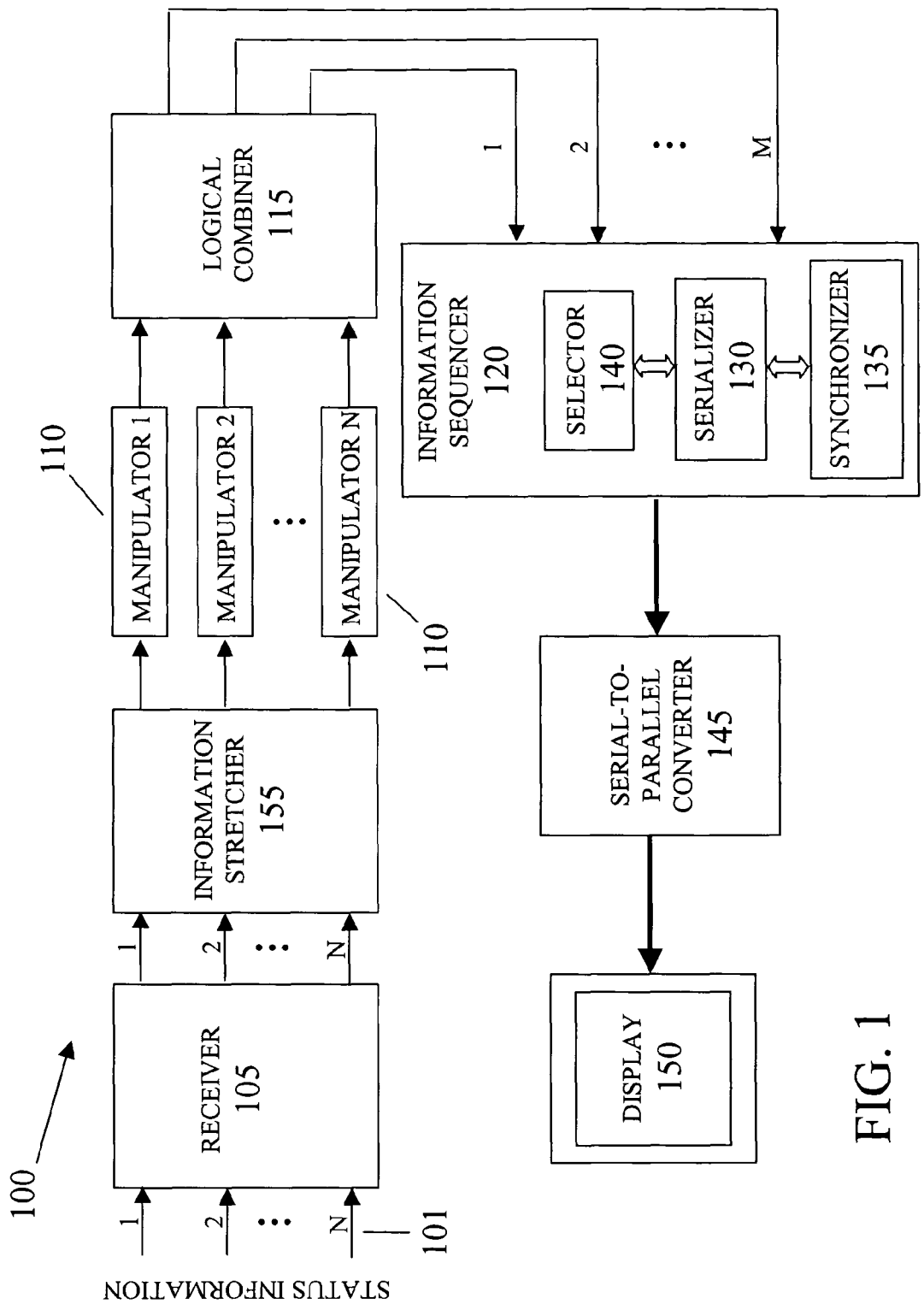
FIG. 1 is a block diagram illustrating a system for customizing indicator information for displaying status information to a user, in accordance with an exemplary embodiment of the present invention.

These and other aspects of the present invention will now be described in greater detail. FIG. 1 is a block diagram illustrating a system 100 for customizing indicator information for displaying status information to a user, in accordance with an exemplary embodiment of the present invention. The system 100 can include a receiver 105 for receiving status information from each of a plurality of devices. The receiver 105 can be any type of electronic component or device that is capable of receiving electrical information. For example, the receiver 105 can be electrical circuitry or firmware configured to receive electrical information. Alternatively, the receiver 105 can be embodied in any type of processor, such as, for example, any type of microprocessor, microcontroller, digital signal processor (DSP), application-specific integrated circuit (ASIC), programmable read-only memory (PROM), erasable programmable read-only memory (EPROM), electrically-erasable programmable read-only memory (EE-PROM), or the like.

For example, the processor can include or be in communication with any type of computer memory or any other type of electronic storage medium that is located either internally or externally to the processor such as, for example, read-only memory (ROM), random access memory (RAM), cache memory, compact disc read-only memory (CDROM), electro-optical memory, magneto-optical memory, or the like. As will be appreciated based on the present description, the memory associated with the processor can, for example, be programmed using conventional techniques known to those having ordinary skill in the art of computer programming. For example, the actual source code or object code of a computer program can be stored in the memory and executed by the processor. However, the receiver 105 can be implemented using any combination of hardware, software, and/or firmware.

The receiver 105 can receive the status information over any type of medium capable of communicating electrical information. For example, input lines 101 can be any type of wires or other electrical cables, fiber optic cables, and the like. Additionally, the receiver 105 can receive the status information wirelessly, using, for example, radio frequency communication. In such an exemplary embodiment, input lines 101 can comprise antennas for receiving, for example, radio frequency communication. However, input lines 101 can be any type of medium capable of communicating electrical information.

According to exemplary embodiments, the status information can be any type of information that provides, for example, an indication of the current operating state or condition of any parameter, attribute or characteristic associated with a device or devices or any part or portion of the device or devices, or any other information that can be of use to a user for assessing the status of the device or devices. According to an exemplary embodiment, the plurality of devices can include ports of a communication device, such as, for example, a network switch, such as an Ethernet switch. For example, each of the input lines 101 can be connected to a port of the network switch, or a single input line 101 can be connected to all of the ports of the network switch. However, the plurality of devices can be any type of electrical device that can provide status information or for which status information can be provided to a user.

According to exemplary embodiments, the receiver 105 can assign the status information received from each of the plurality of devices to one of a plurality of classes to generate class information for each of the plurality of classes. According to exemplary embodiments, each of the plurality of classes can be associated with a different characteristic of the plurality of devices. For example, a characteristic of a port of an Ethernet switch can include the port speed, full duplex or half duplex, communications link up or down, port activity, port disabled, packet collision, erroneous frame receiving, or any other characteristic or attribute of each of the ports of the Ethernet switch. However, a characteristic of a device can be any condition, state or other property associated with the device. Table 1 illustrates a mapping of class to characteristic for a communications switch for fourteen classes, according to an exemplary embodiment of the present invention. However, the number and types of characteristics, and, hence, the number and types of classes, will be dependent upon the type of device or devices for which status information is being obtained and/or the status information available for the device or devices. Thus, other classes and characteristics can be used.

TABLE 1

Exemplary Class Description

| CLASS NUMBER | DEVICE CHARACTERISTIC |
| --- | --- |
| 0 | Speed is 1000 Mbps |
| 1 | Speed is 100 Mbps |
| 2 | Full Duplex |
| 3 | Link Up |
| 4 | Activity |
| 5 | Half Duplex |
| 6 | Port Disabled |
| 7 | Collision |
| 8 | Erroneous Frame in Rx |
| 9 | Cascading Port |
| 10 | Spanning Tree State |
| 11 | Speed is 10 Mbps |
| 12 | Port Doing Pressure |
| 13 | Link Down |

For example, according to exemplary embodiments, to assign the status information to one of the plurality of classes, the receiver 105 can decode or otherwise interpret unique identifying information contained within the status information to determine, for example, the device to which the status information applies, the nature of the status information, any values or other quantitative information contained in the status information, and the like. In the example of an Ethernet switch, the status information could be comprised of individual status messages for each of the ports of the switch, or a single status message that includes the status information for all of the ports. In either case, the status message or messages can include identifying information that allows a user to differentiate the status information for each of the ports. For example, if the status information message includes special symbols or characters that delineate a status message, the receiver 105 can parse the message sequence to determine the start of the status message and to extract the relevant information from the message. Using the identifying information, the receiver 105 can assign the status information to the appropriate class, for example, by using a lookup table or the like. The nature and type of the identifying information contained in the status information will be dependent upon the device for which status information is being sought, as the identifying information may vary between manufacturers. The output of the receiver 105 can be the class information for each of the classes to which the status information for the device or devices has been assigned.

According to an exemplary embodiment, the receiver 105 can disable the use of at least one of the plurality of classes upon occurrence of an event. For example, the event can be a communications link to a port of an Ethernet switch being down. In such a case, since the communications link is down, the user would not receive status information on certain types of status. Using Table 1 as an example for purposes of illustration and not limitation, classes such as Class 0 ("Speed is 1000 Mbps"), Class 1 ("Speed is 100 Mbps"), Class 2 ("Full Duplex"), Class 4 ("Activity") and Class 5 ("Half Duplex") can be disabled when the communications link is down, as this status information may not be available, for example, during the time when the communications link is down. However, any or all classes can be disabled in response to any type of event associated with the plurality of devices, such as a collision associated with information communication, any status change or the like.

The system 100 can include a plurality of manipulators 110 for altering at least one attribute of the class information for at least one of the plurality of classes. The plurality of manipulators 110 can be any type of electronic component or device that is capable of modifying electrical information to change a state or content of that electrical information. For example, the plurality of manipulators 110 can be electrical circuitry or firmware or can be embodied in any type of processor, such as the same or different processor into which receiver 105 can be embodied. According to exemplary embodiments, each of the plurality of manipulators 110 corresponds to one of the plurality of classes and can alter or otherwise manipulate the class information associated with the corresponding class. Alternatively, a single manipulator can be used to alter or otherwise manipulate attributes of the class information for all of the classes. Thus, attributes can be controlled for each class separately, for all classes collectively, or for any combination of classes.

According to exemplary embodiments, an attribute of the class information can include at least one of forced, inversion and blinking. For example, the forced attribute of the class information can substitute information specified by the user for the class information. The inversion attribute can invert the class information by performing, for example, a logical NOT on the class information. The blinking attribute can cause the class information to blink. However, any desired attribute of the class information can be altered or otherwise manipulated. According to exemplary embodiments, the user can specify the at least one attribute to alter for the at least one of the plurality of classes. In other words, the user can alter any or all of the attributes for none, any or all of the class information for the plurality of classes. According to an exemplary embodiment, the attributes can be incremental, such that the class information can be set to forced data, the forced data can be set to blink, and the blinking forced data can be inverted. However, the attributes can be applied to the class information in any desired combination and in any order, whether or not done so incrementally. Table 2 illustrates examples of the result of altering or otherwise manipulating class information, where "RawData" is the raw (unaltered) class information, "ForceData" is the information substituted for the class information, "Blink" represents the blinking information, "AND" is a logical AND operation, and "~" represents a logical NOT operation.

TABLE 2

Manipulated Class Information Description

| Force | Blink | Invert | Manipulated Class Information |
|---|---|---|---|
| 0 | 0 | 0 | RawData |
| 0 | 0 | 1 | ~RawData |
| 0 | 1 | 0 | RawData AND Blink |
| 0 | 1 | 1 | ~(RawData AND Blink) |
| 1 | 0 | 0 | ForceData |
| 1 | 0 | 1 | ~ForceData |
| 1 | 1 | 0 | ForceData AND Blink |
| 1 | 1 | 1 | ~(ForceData AND Blink) |

According to an exemplary embodiment, the classes 0-6 illustrated in Table 1 can be subjected to manipulation according to Table 2. However, any of the attributes of any of the plurality of classes can be altered or otherwise manipulated.

According to exemplary embodiments, the system 100 can include a plurality of blinking mechanisms configured to cause blinking of the indicator information. Each of the plurality of blinking mechanism can be associated with a duty cycle and a rate. For example, according to an exemplary embodiment, each blinking mechanism can be used to control the rate of blinking from approximately 11 milliseconds to approximately 700 milliseconds, although the rate of blinking for any of the blinking mechanisms can be chosen to be any value. At least one class of the plurality of classes can be associated with one of the plurality of blinking mechanisms. Thus, a user can specify that none, any, or all classes are associated with a blinking mechanism. According to exemplary embodiments, all classes associated with a blinking mechanism blink at the duty cycle and rate specified for that blinking mechanism. For example, as illustrated in Table 2, the class information can be logically AND'ed with a blink value to cause class information to blink. The blink value can be associated with a blinking pattern, such as that maintained in a lookup table or the like stored in memory. The blink value can be, for example, a bit pattern. Logically AND'ing the class information with a blink value can set the appropriate bits in the class information. The class information can be subsequently decoded according to exemplary embodiments, and cause blinking of the corresponding indicator information at the duty cycle and rate specified associated with the blink value. However, other blinking mechanisms for causing the indicator information to blink can be used.

The system 100 can include a logical combiner 115 for combining class information from the plurality of classes into a plurality of combinational groups to customize the content of indicator information in each of the plurality of combinational groups. According to exemplary embodiments, the user can specify which of the plurality of classes to combine to form each of the plurality of combinational groups. Each of the plurality of combinational groups can be formed according to a predetermined function. The logical combiner 115 can be any type of electronic component or device that is capable of performing logical operations on input values. For example, the logical combiner 115 can be electrical circuitry or firmware (e.g., AND, OR and NOT gates) or can be embodied in any type of processor, such as the same or different processor into which receiver 105 and manipulators 110 can be embodied.

Thus, logical combiner 115 can perform a logical operation on (possibly manipulated) class information, from classes chosen by the user, according to a predetermined function to combine the classes into each of one or more groups. According to an exemplary embodiment, four groups can be defined, although any number of groups can be used. In such an exemplary embodiment, the groups allow user-defined indication generation by performing combinational logic on up to four classes. According to the present exemplary embodiment, the predetermined function is illustrated in Equation (1):

$$(\text{ClassA AND ClassB}) \text{ OR } (\text{ClassC AND ClassD}) \tag{1}$$

Equation (1) can be modified to accommodate more or less classes, for example by adding more parenthetical AND expressions that are OR'ed together, or by removing such parenthetical AND expressions. According to the present exemplary embodiment, the user can choose to use less than four classes for the combinational logic. For example, the user can select a non-existing class (e.g., classes 14 or 15 for the classes listed in Table 1). By selecting a non-existing class, the data can be set as 0 for ClassA and ClassC, and as 1 for ClassB and ClassD. Thus, users can tailor the output indicator generation to suit their particular needs and requirements by specifying the classes they wish to combine and how those classes are combined.

For purposes of illustration and not limitation, several examples of combinational groupings that can be implemented using logical combiner 115 and Equation (1) are shown in Table 3. In Table 3, the class information applied to the logical combiner 115 is assumed to be not manipulated (i.e., raw), and the class designations correspond to those listed in Table 1, where "X" represents "don't care."

TABLE 3

Group Data Illustrations

| ClassA | ClassB | ClassC | ClassD | Group Data |
|---|---|---|---|---|
| 2 | 4 | 8 | 15 | (FullDuplex AND Activity) OR CascadingPort |
| 2 | 4 | 15 | X | (FullDuplex AND Activity) |
| 13 | 8 | 10 | 1 | (LinkFail AND CascadingPort) OR (PortDisabled AND Speed100) |

However, since the input to the logical combiner 115 is the manipulated class information from manipulators 110, more complicated expressions can be implemented, such as that illustrated in Equation (2).

$$((\sim\text{Speed1000 AND FullDuplex}) \text{ OR } ((\text{Activity AND Blink0}) \text{ AND LinkUp})) \tag{2}$$

In the example of Equation (2): a.) ClassA is chosen to be Class 0 ("Speed is 1000 Mbps"), where the class information for Class 0 is inverted by the corresponding manipulator 110; b.) ClassB is chosen to be Class 2 ("Full Duplex") and not manipulated; c.) ClassC is chosen to be Class 4 ("Activity"), where the class information for Class 4 is caused to blink by a corresponding manipulator 110 (e.g., represented in Equation (2) by performing a logical AND operation between the Class 4 information and the blink value associated with a first blink mechanism, "Blink0"); d.) ClassD is chosen to be Class 3 ("Link Up"). Many other expressions of greater or lesser complexity are possible for each combinational group according to exemplary embodiments of the present invention, using, for example, Equation (1) to combine class information in each group, to suit the user's needs and requirements for the indication generation content and display.

The system 100 can include an information sequencer 120 for modifying an order of indicator information from the plurality of combinational groups. According to exemplary embodiments, the user can specify the order of information in the stream of indicator information to customize a display of the stream of indicator information. The information sequencer 120 can be any type of electronic component or device that is capable of controlling the relative location of bits in an output stream of data. For example, the information sequencer 120 can be electrical circuitry or firmware or can be embodied in any type of processor, such as the same or different processor into which receiver 105, manipulators 110 and logical combiner 115 can be embodied.

Although the information can be output in parallel, according to an exemplary embodiment, the information sequencer 120 can take the information from each of the combinational groups output by logical combiner 115 and combine that information to form a serial stream of bits of indicator information. For example, for each combinational group, the logical combiner 115 can output one bit per device, such as, for example, one bit per port of an Ethernet switch. However, the logical combiner 115 can output the information from the combinational groups in any quantity and in any order, as specified by the user. With a series of bits from each of the combinational groups as input to the information sequencer 120, the information sequencer 120 can then rearrange the relative location of those bits in the output from the information sequencer 120 according to the needs and requirements of the user (e.g., so that the indicator information will be arranged in a desired manner on a display).

According to an exemplary embodiment, the information sequencer 120 can order the stream of indicator information according to class, combinational group or device. However, the stream of indicator information can be ordered in any manner to suit the needs and requirements of the user. For purposes of illustration and not limitation, for an Ethernet switch or the like, the input information can be ordered by the information sequencer 120 according to class/group or by port. For example, the input information can be ordered according to information type (e.g., by class, then by port) or according to port (e.g., all port-related information for a given port is in one group). By default, the order can be by class, so that the status information for the first class can be displayed for all ports, then the status information for the second class can be displayed for all ports, and so on, although any default ordering can be used. According to an exemplary embodiment, up to 256 indications can be latched, although any number of indications can be latched. In such an exemplary embodiment, a block of indicator information can comprise 256 bits. Consequently, the stream of bits of indicator information would be comprised of a series of blocks of 256 bits of indicator information.

Using the fourteen classes specified in Table 1 as an example and with 256 indications and four groups, each indication corresponding to a bit, Table 4 illustrates an example of how bits can be ordered according to class and group for an Ethernet switch having 12 ports. In Table 4, each bit corresponds to a port. Thus, for example, for Class 0 and bits 0 to 11, bit 0 is the Class 0 indication of the first port, while bit 11 is the Class 0 indication of the twelfth port. For Class 1 and bits 12 to 23, bit 12 is the Class 1 indication of the first port, while bit 23 is the Class 1 indication of the twelfth port, and so on. For each group, the indications are for all ports (e.g., for Group 0, bit 168 is the indication of the first port, while bit 179 is the indication of the twelfth port).

TABLE 4

Ordering Indicator Information by Class/Group

| BITS | INDICATIONS |
| --- | --- |
| 11:0 | Class 0 |
| 23:12 | Class 1 |
| 35:24 | Class 2 |
| 47:36 | Class 3 |
| 59:48 | Class 4 |
| 71:60 | Class 5 |
| 83:72 | Class 6 |
| 95:84 | Class 7 |
| 107:96 | Class 8 |
| 119:108 | Class 9 |
| 131:120 | Class 10 |
| 143:132 | Class 11 |
| 155:144 | Class 12 |
| 167:156 | Class 13 |
| 179:168 | Group 0 |
| 191:180 | Group 1 |
| 203:192 | Group 2 |
| 215:204 | Group 3 |
| 229:216 | CPU Port Data |
| 237:230 | GPP |
| 253:238 | Reserved |
| 254 | Blink 1 |
| 255 | Blink 0 |

As shown in Table 4, additional information can be obtained in the 256 indications, including information on the CPU port of the network switch and the like. The information contained in the 256 indications can also include an indication of the blink mechanism for information that is to be blinked (in Table 4, two blink mechanisms are defined—Blink 0 and Blink 1). However, other information can be contained in the indicator information and the blocks of bits of indicator information can be of any length to accommodate the indicator information desired by the user.

According to the present illustration, the bits can also be ordered according to port. Using the classes specified in Table 1 as an example and with 256 indications, each indication corresponding to a bit, Table 5 illustrates an example of how bits can be ordered according to port for an Ethernet switch having 12 ports. In Table 5, each bit corresponds to a class. Thus, for example, for Port 0 and bits 0 to 13, bit 0 is the Class 0 indication of the first port, while bit 13 is the Class 13 indication. For Port 1 and bits 14 to 27, bit 14 is the Class 0 indication of the second port, while bit 27 is the Class 13 indication of the twelfth port, and so on. For groups, the indications relate to the groups for each port. For example, for Port 0 and bits 168 to 171, bit 168 is the indication of the first group (Group 0), while bit 171 is the indication of the fourth group (Group 3). For Port 1 and bits 172 to 175, bit 172 is the indication of the first group, while bit 175 is the indication of the fourth group, and so on.

TABLE 5

Ordering Indicator Information by Port

| BITS | INDICATIONS |
| --- | --- |
| 13:0 | Port 0 Classes |
| 27:14 | Port 1 Classes |
| 41:28 | Port 2 Classes |
| 55:42 | Port 3 Classes |
| 69:56 | Port 4 Classes |
| 83:70 | Port 5 Classes |
| 97:84 | Port 6 Classes |
| 111:98 | Port 7 Classes |
| 125:112 | Port 8 Classes |
| 139:126 | Port 9 Classes |
| 153:140 | Port 10 Classes |
| 167:154 | Port 11 Classes |
| 171:168 | Port 0 Groups |
| 175:172 | Port 1 Groups |
| 179:176 | Port 2 Groups |
| 183:180 | Port 3 Groups |
| 187:184 | Port 4 Groups |
| 191:188 | Port 5 Groups |
| 195:192 | Port 6 Groups |
| 199:196 | Port 7 Groups |
| 203:200 | Port 8 Groups |
| 207:204 | Port 9 Groups |
| 211:208 | Port 10 Groups |
| 215:212 | Port 11 Groups |
| 229:216 | CPU Port Data |
| 237:230 | GPP |
| 253:238 | Reserved |
| 254 | Blink 1 |
| 255 | Blink 0 |

As shown in Table 5, additional information can be obtained in the 256 indications, including information on the CPU port of the network switch and the like. The information contained in the 256 indications can also include an indication of the blink mechanism for information that is to be blinked (in Table 5, two blink mechanisms are defined—Blink 0 and Blink 1). However, other information can be contained in the indicator information and the blocks of bits of indicator information can be of any length to accommodate the indicator information desired by the user.

According to exemplary embodiments, the information sequencer 120 can output the stream of indicator information as a serial stream of bits of indicator information. In other words, the indicator information output by the information sequencer 120 can be comprised of a series of bits, with each bit representing, for example, status information of a specific characteristic of each of the plurality of devices. Accordingly, the information sequencer 120 can include a serializer 130 from generating a serial stream of bits of indicator information from the stream of indicator information. The serializer 130 can be any type of electronic component or device that is capable of generating a serial stream of bits of data from multiple data inputs. For example, the serializer 130 can be electrical circuitry or firmware or can be embodied in any type of processor, such as the same or different processor into which receiver 105, manipulators 110, logical combiner 115, and information sequencer 120 can be embodied. The serializer 130 can be, for example, a parallel-to-serial converter or a multiplexer for taking the input from each of the plurality of combinational groups and forming a serial stream of bits of information from that input. For example, the information sequencer 120 can control the order of bits that are input to the serializer 130 to modify the order of bits of information in the serial stream of bits of indicator information that is output by the serializer 130, in the manner specified by the user.

Exemplary embodiments of the present invention can be used to display status information from multiple streams of indicator information, where each stream of indicator information includes status information from a different device (e.g., more than one Ethernet switch). For example, the receiver 105 can receive status information from different devices, which can be assigned to classes, manipulated, logically combined, the order of the logically combined information modified to suit the user's requirements, and serialized into a single stream of bits of indicator information. However, in manipulating the class information for the different devices to cause any or all of that information to blink, it is possible that the blinking rates may not be synchronized. Consequently, the serializer 130 can include a synchronizer 135 for synchronizing different serial streams of bits of indicator information to synchronize the blinking rate of information included in the different serial streams of bits of indicator information. For example, the synchronizer 135 can cause a restart of the system 100, or any part thereof, to allow for blink synchronization. Alternatively, the synchronizer 135 can analyze the phase relation between a core clock and the data to determine the magnitude of the phase difference between the streams of indicator information. The synchronizer 135 can then cause the serializer 130 to manipulate the resulting serial stream of bits of indicator information to alter the phase relation between the input streams. However, any means can be used for synchronizing the different streams of indicator information.

To give the user greater control to customize the presentation of indicator information, exemplary embodiments allow the user to select portions or subsets of the serial stream of bits of indicator information for display. Accordingly, the information sequencer 120 can include a selector 140 for selecting a portion of the serial stream of bits of indicator information to display a subset of the status information to the user. According to exemplary embodiments, the user can specify the portion of indicator information to select. The selector 140 can control the length of the serial stream of bits of indicator information by altering the start and the end of the serial stream of bits of indicator information to generate a frame of indicator information. The frame of indicator information can comprise a portion of indicator information included in the serial stream of bits of indicator information. According to exemplary embodiments, the user can specify the start and the end of the serial stream of bits of indicator information to specify the portion of indicator information to select.

For example, the selector 140 can comprise a shift register. The shift register can have a data input upon which to receive the stream of bits of indicator information, a clock input signal that can be used to shift bits into the shift register, and a strobe signal that can be used to latch bits to the output of the shift register. Assuming 256 bits of information (although any number of bits can be used to specify the indications), a counter associated with the shift register can be used to select bits within the 256 bits. In such an embodiment, START and END parameters can be specified by the user. For example, to select the entire 256 bits, the START parameter can be set to 0 and the END parameter can be set to 255. To select the middle 128 bits, the START parameter can be set to 63 and the END parameter can be set to 190. Other combinations are possible. The counter can then count from 0 to 256. When the counter reaches the value of the START parameter, the strobe signal can be activated to latch the input data to the output. When the counter reaches the END parameter, the strobe signal can be deactivated, and the input data will no longer be latched to the output. By default, the START and END parameters can be set so that all information at the input of the shift register is also output by the shift register. The START and END parameters can be subsequently changed, depending on the preferences of the user. Consequently, the serialized data can comprise the selected data as defined by START and END.

If information is output serially by the information sequencer 120, the system 100 can also include a serial-to-parallel converter 145 for converting the serial stream of bits of indicator information to parallel streams of indicator information. For example, if the indicator information is to be displayed using LEDs, the serial stream of bits of indicator information can be segregated into parallel streams used to drive the LEDs. Thus, the parallel streams of indicator information can be used to display the status information of the plurality of devices. The serial-to-parallel converter 145 can be any type of electronic component or device that is capable of generating parallel streams of data from serial input data. For example, the serial-to-parallel converter 145 can be electrical circuitry or firmware. For example, the serial-to-parallel converter 145 can be any type of serial-to-parallel shift register or the like. According to exemplary embodiments, the serial-to-parallel converter 145 can be located externally and remotely to receiver 105, manipulators 110, logical combiner 115 and information sequencer 120. According to such an embodiment, the serial-to-parallel converter 145 can be connected to the output of the information sequencer 120 using any type of electrical connection capable of communicating electrical information, such as a wire or other electrical cable, fiber optic cable, and the like. However, the serial-to-parallel converter 145 can be embodied, for example, in any type of processor, such as the same or different processor into which receiver 105, manipulators 110, logical combiner 115 and information sequencer 120 can be embodied.

According to an alternative exemplary embodiment, instead of being associated with the information sequencer 120, the serial-to-parallel converter 145 can comprise the selector 140. In such an alternative exemplary embodiment, the selector 140 associated with serial-to-parallel converter 145 can be used to specify the start and the end of the serial stream of bits of indicator information input to the serial-to-parallel converter 145 to specify the portion of indicator information to select for serial-to-parallel conversion.

The system 100 can include a display 150 for displaying the status information of the plurality of devices to the user using the stream of indicator information. The display 150 can be any type of display device that is capable of displaying indicator information to a user. According to an exemplary embodiment of the present invention, the display can comprise a multiple element display, such as a plurality of individual LEDs. However, the display 150 can also include a Liquid Crystal Display (LCD), any type of video or computer monitor, or any other type of display device. The display 150 can be located either locally or remotely to the other components that comprise system 100, and be in communication with the serial-to-parallel converter 145 using any type of electrical connection capable of communicating electrical information, such as a wire or other electrical cable, fiber optic cable, and the like.

For a display 150 comprised of LEDs, it is possible that the input information received by receiver 105 may be comprised of pulses of information, the duration of each of which may be too short to be discernible by the human eye. The duration of a pulse will determine how long that information is displayed to the user using the LEDs of display 150. If a pulse is only a few milliseconds in duration and pulses occur in rapid succession, it is unlikely that the user will be able to differentiate the corresponding flashing of the LEDs, as the flashing may be occurring so quickly as to indistinguishable to the user from a LED that is steady on. Consequently, the system 100 can include an information stretcher 155 for stretching the status information received from at least one of the plurality of devices by a predetermined amount. The information stretcher 155 can be connected at the output of receiver 105 to stretch the status information after it has been received by the receiver 105. Alternatively, the receiver 105 can comprise the information stretcher 155, stretching the status information as it is received by the receiver 105. The information stretcher 155 can be any type of electronic component or device that is capable of stretching or otherwise extending the time duration of the status information. For example, the information stretcher 155 can be electrical circuitry or firmware or can be embodied in any type of processor, such as the same or different processor into which receiver 105, manipulators 110, logical combiner 115 and information sequencer 120 can be embodied. According to exemplary embodiments, the user can specify the predetermined amount of information stretching. For example, the information stretcher 155 can stretch input pulses of status information anywhere from approximately 5 milliseconds to 700 milliseconds. However, the information stretcher 155 can stretch the input pulses of the status information to any desired time length to facilitate display of the corresponding information on the LEDs of display 150.

For purposes of illustration and not limitation, an example of the application of exemplary embodiments of the present invention will now be described. For example, exemplary embodiments can be used with the Cisco Systems CATALYST™ 2950 series Ethernet switches to display, on a LED panel, status information concerning the ports of the switch. For purposes of the present example, the classes illustrated in Table 1 can be used, along with Equation (1). It is assumed that two blink mechanisms are available—Blink 0 and Blink 1. Table 6 illustrates exemplary requirements for displaying status information on a LED panel for each of the ports of a CATALYST™ 2950 series Ethernet switch.

TABLE 6

Exemplary Requirements for Displaying Status Information

| CONDITION | LED INDICATION |
| --- | --- |
| No Link | OFF |
| Link is Present | SOLID GREEN |
| Activity on Port | FLASHING GREEN |
| Link Fault | ALTERNATING GREEN/AMBER |
| Port is Disabled | SOLID AMBER |

To implement the requirements illustrated in Table 6 using the classes illustrated in Table 1, Class 3 ("Link Up"), Class 4 ("Activity"), Class 6 ("Port Disabled") and Class 8 ("Erroneous Frame in Rx") can be used. Two groups can be used to control a bi-color LED. For the first group, if the link is up and there is no activity, then a solid indication will result. If there is activity, then the indication will blink. Thus, a green LED can be used for the first group. For the second group, if there are no errors in receiving, then the indication will be off, and when the port is disabled, the indication will be on. Thus, an amber LED can be used for the second group. Consequently, two LEDs can be used for each port, one green LED and one amber LED. Any suitable green and amber LEDs can be used. In the present illustration, each port can have two bits associated with it, with one bit connected to the green LED and one bit connected to the amber LED. To control blinking, the first blink mechanism, Blink 0, can be assigned to the first group, and the second blink mechanism, Blink 1, can be assigned to the second group. The Blink 0 and Blink 1 blinking mechanisms can be programmed with different duty cycles to control the blinking of the green and amber LEDs. For example, the duty cycle of Blink 0 can be programmed with the opposite duty cycle of Blink 1, although other duty cycles and rates can be specified by the user. Alternatively, for example, the same blinking mechanism (e.g., Blink 0) can be used for both groups, but the blinked data can be inverted for one of the groups, such as by the equation: ~(group1 AND Blink0) OR (group2 AND Blink0), where "group1" is the blinked data associated with the first group and "group2" is the blinked data associated with the second group.

Using Equation (1), the first combinational group can be expressed according to Equation (3):

$$(\text{LinkUp AND} \sim(\text{Activity AND Blink0})) \quad (3)$$

Equation (3) can be created by assigning each of ClassC and ClassD to 0 in Equation (1). Using Equation (1), the second combinational group can be expressed according to Equation (4):

$$(\text{ErrorRx AND Blink1}) \text{ OR } (\text{PortDisabled}) \quad (4)$$

Equation (4) can be created by assigning each of ClassB and ClassD to 1 in Equation (1). Thus, Equation (3) can control the green LED and Equation (4) can control the amber LED, and the logical combiner 115 can then be programmed to generate combinational groups according to each of these equations.

Using the system 100, the receiver 105 can assign the received status information from the CATALYST™ 2950 series Ethernet switch to Class 3 ("Link Up"), Class 4 ("Activity"), Class 6 ("Port Disabled") or Class 8 ("Erroneous Frame in Rx"). The class information from Class 4 can be altered by the corresponding manipulator 110 to cause that class information to blink at the duty cycle and rate specified for the first blinking mechanism. The class information from Class 8 can be altered by the corresponding manipulator 110 to cause that class information to blink at the duty cycle and rate specified for the second blinking mechanism. The logical combiner 115 can combine the various class information into the two combinational groups specified by Equations (3) and (4). The order of the information from the two combinational groups can then be modified, if desired, and the information serialized into a stream of bits of indicator information by serializer 130. The serial-to-parallel converter 145 can then take the series of bits of indicator information and output them as parallel streams to drive the corresponding LEDs for each of the ports.

Figure 2:
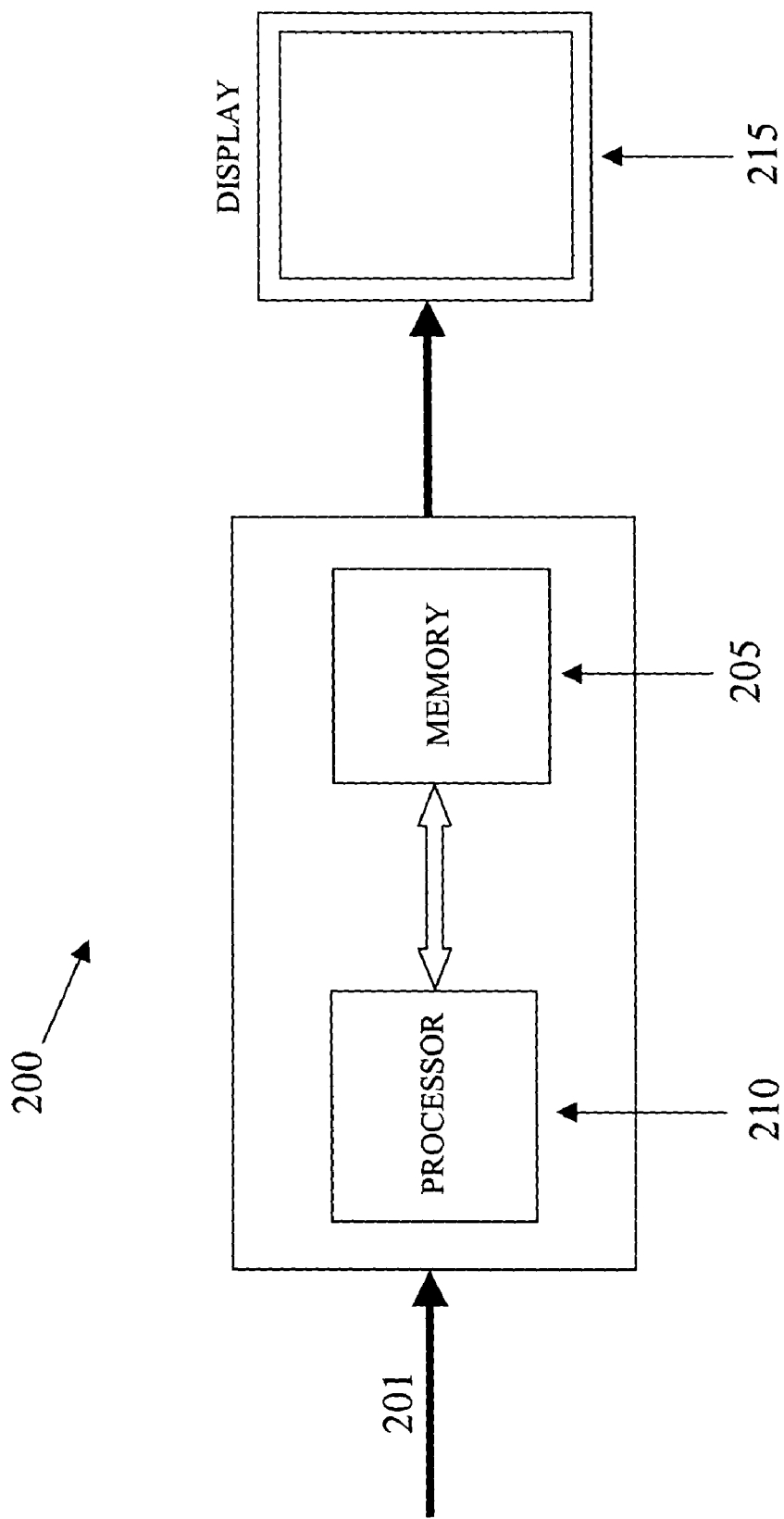
FIG. 2 is a block diagram illustrating a system for customizing indicator information for displaying status information to a user, in accordance with an alternative exemplary embodiment of the present invention.

FIG. 2 is a block diagram illustrating a system 200 for customizing indicator information for displaying status information to a user, in accordance with an alternative exemplary embodiment of the present invention. The system 200 includes a memory 205 that stores steps of a computer program. The memory 205 can be any type of computer memory or any other type of electronic storage medium, such as, for example, read-only memory (ROM), random access memory (RAM), cache memory, compact disc read-only memory (CDROM), electro-optical memory, magneto-optical memory, or the like. As will be appreciated based on the foregoing description, the memory 205 can, for example, be programmed using conventional techniques known to those having ordinary skill in the art of computer programming. For example, the actual source code or object code of a computer program can be stored in the memory 205.

The memory 205 can store the steps of a computer program to receive status information from each of a plurality of devices. According to an exemplary embodiment, the plurality of devices can include ports of a communication device. The communication device can be, for example, a network switch, such as an Ethernet switch. However, the plurality of devices can be any electronic device for which the user wishes to obtain status information. The status information can be received on input 201, which can be any type of connection capable of communicating electrical information, such as, for example, a wire or other electrical cable, a fiber optic cable, or the like.

The memory 205 can store the steps of a computer program to assign the status information received from each of the plurality of devices to one of a plurality of classes to generate class information for each of the plurality of classes. According to exemplary embodiments, each of the plurality of classes can be associated with a different characteristic of the plurality of devices. A characteristic of a device can be any condition, state or other property associated with the device. For example, a characteristic of a port of an Ethernet switch can include the port speed, full duplex or half duplex, communications link up or down, port activity, port disabled, packet collision, erroneous frame receiving or any other characteristic or attribute of each of the ports of the Ethernet switch. The memory 205 can store the steps of a computer program to disable the use of at least one of the plurality of classes upon occurrence of an event. The event can be any condition or state associated with the device, such as, for example, a communications link of a port of an Ethernet switch being down, or any other event, such as a collision associated with information communication, any status change or the like.

The memory 205 can store the steps of a computer program to alter at least one attribute of the class information for at least one of the plurality of classes. According to exemplary embodiments, the user can specify the at least one attribute to alter for the at least one of the plurality of classes. According to an exemplary embodiment, the attribute of the class information can be at least one of forced, inversion and blinking. For example, the forced attribute of the class information can substitute information specified by the user for the class information, while the inversion attribute can invert the class information. According to an exemplary embodiment, to perform blinking of the class information, the memory 205 can store the steps of a computer program to associate at least one class of the plurality of classes with one of a plurality of blinking mechanisms configured to cause blinking of the indicator information. Each of the plurality of blinking mechanism can be associated with a duty cycle and a rate. According to an exemplary embodiment, all classes associated with a blinking mechanism can blink at the duty cycle and rate specified for that blinking mechanism.

The memory 205 can store steps of a computer program to combine class information from the plurality of classes into a plurality of combinational groups to customize the content of indicator information in each of the plurality of combinational groups. According to exemplary embodiments, the user can specify which of the plurality of classes to combine to form each of the plurality of combinational groups. According to an exemplary embodiment, each of the combinational groups can be formed according to a predetermined function. For example, the predetermined function can comprise a logical AND of a first value with a second value to generate a first result, a logical AND of a third value with a fourth value to generate a second result, and a logical OR of the first result with the second result to generate a combinational group.

To give the user control of, for example, the layout of the display of indicator information to the user, the memory 205 can store steps of a computer program to modify an order of indicator information from the plurality of combinational groups to generate a stream of indicator information. According to exemplary embodiments, the user can specify the order of information in the stream of indicator information to customize the display of the stream of indicator information. According to an exemplary embodiment, the memory 205 can store the steps of a computer program to order the stream of indicator information according to class, combinational group or device, although the information can be ordered in any manner specified by the user. Additionally, the memory 205 can store the steps of a computer program to generate a serial stream of bits of indicator information from the stream of indicator information. Consequently, the memory 205 can store the steps of a computer program to convert the serial stream of bits of indicator information to parallel streams of indicator information. According to an exemplary embodiment, the parallel streams of indicator information can be used for displaying the status information of the plurality of devices.

To give the user further control of the layout of the display of the indicator information, the memory 205 can store the steps of a computer program to select a portion of the serial stream of bits of indicator information to display a subset of the status information to the user. According to exemplary embodiments, the user can specify the portion of indicator information to select. To perform the selection, the memory 205 can store the steps of a computer program to control the length of the serial stream of bits of indicator information by altering the start and the end of the serial stream of bits of indicator information to generate a frame of indicator information. According to an exemplary embodiment, the frame of indicator information can comprise a portion of indicator information included in the stream of indicator information. According to exemplary embodiments, the user can specify the start and the end of the serial stream of bits of indicator information to specify the portion of indicator information to select.

The memory 205 can store the steps of a computer program to display the status information of the plurality of devices to the user using the stream of indicator information. According to an exemplary embodiment, the stream of indicator information can be displayed to the user on a multiple element display to display the status of the plurality of devices to the users. For example, a display 215 can be comprised of a plurality of individual LEDs. However, the display 215 can be any type of display device that is capable of displaying indicator information to a user, such as a Liquid Crystal Display (LCD), any type of video or computer monitor, or any other type of display device. The display 215 can be located either locally or remotely to the other components of system 200, and be in communication with the other components of system 200 using any type of electrical connection capable of communicating electrical information, such as a wire or other electrical cable, fiber optic cable, and the like.

For the exemplary embodiment of a display 215 comprised of LEDs, if the status information received on input 201 is comprised of pulses, and those pulses are of too short a time duration to allow a user to properly view the corresponding indicator information on the LED display, the memory 205 can store the steps of a computer program to stretch the status information received from at least one of the plurality of devices by a predetermined amount. According to exemplary embodiments, the user can specify the predetermined amount of information stretching, which can be of any time length. In addition, if multiple streams of indicator information are being processed by the system 200, and at least some of the information contained within those different streams is caused to blink, the blinking rates of the information contained within those different streams may need to be synchronized. Accordingly, the memory 205 can store the steps of a computer program to synchronize different streams of indicator information to synchronize a blinking rate of information included in different streams of indicator information.

The system 200 can include a processor 210 for accessing the memory 205 to execute the computer program. The processor 210 can be any type of processor, such as, for example, any type of microprocessor, microcontroller, digital signal processor (DSP), application-specific integrated circuit (ASIC), programmable read-only memory (PROM), erasable programmable read-only memory (EPROM), electrically-erasable programmable read-only memory (EEPROM), or the like.

Figure 3:
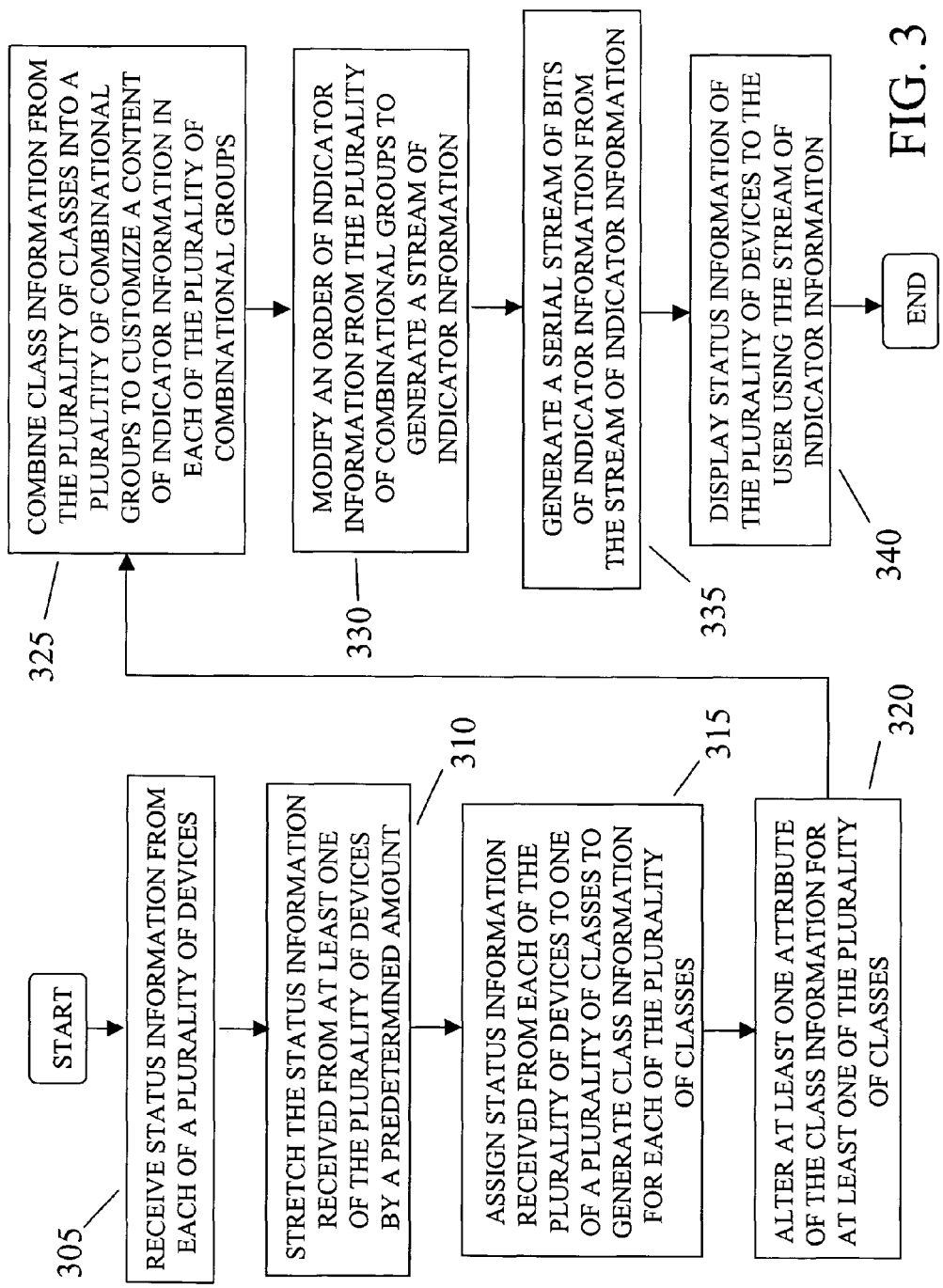
FIG. 3 is a flowchart illustrating steps for customizing indicator information for displaying status information to a user, in accordance with an exemplary embodiment of the present invention.

FIG. 3 is a flowchart illustrating steps for customizing indicator information for displaying status information to a user, in accordance with an exemplary embodiment of the present invention. In step 305, status information can be received from a plurality of devices. According to an exemplary embodiment, the plurality of devices can include ports of a communication device. The communication device can be, for example, a network switch, such as an Ethernet switch. However, the plurality of devices can be any electronic device for which the user wishes to obtain status information. According to an exemplary embodiment, the received status information can be comprised of pulses. If those pulses are of too short a time duration to allow a user to properly view the corresponding indicator information, in step 310, the status information received from at least one of the plurality of devices can be stretched by a predetermined amount. According to exemplary embodiments, the user can specify the predetermined amount of information stretching, which can be of any time length. For example, the information stretching can occur after the status information is received or concurrently with reception.

In step 315, the status information received from each of the plurality of devices can be assigned to one of a plurality of classes to generate class information for each of the plurality of classes. According to exemplary embodiments, each of the plurality of classes can be associated with a different characteristic of the plurality of devices. A characteristic of a device can be any condition, state or other property associated with the device. For example, a characteristic of a port of an Ethernet switch can include the port speed, full duplex or half duplex, communications link up or down, port activity, port disabled, packet collision, erroneous frame receiving or any other characteristic or attribute of each of the ports of the Ethernet switch.

Figure 4:
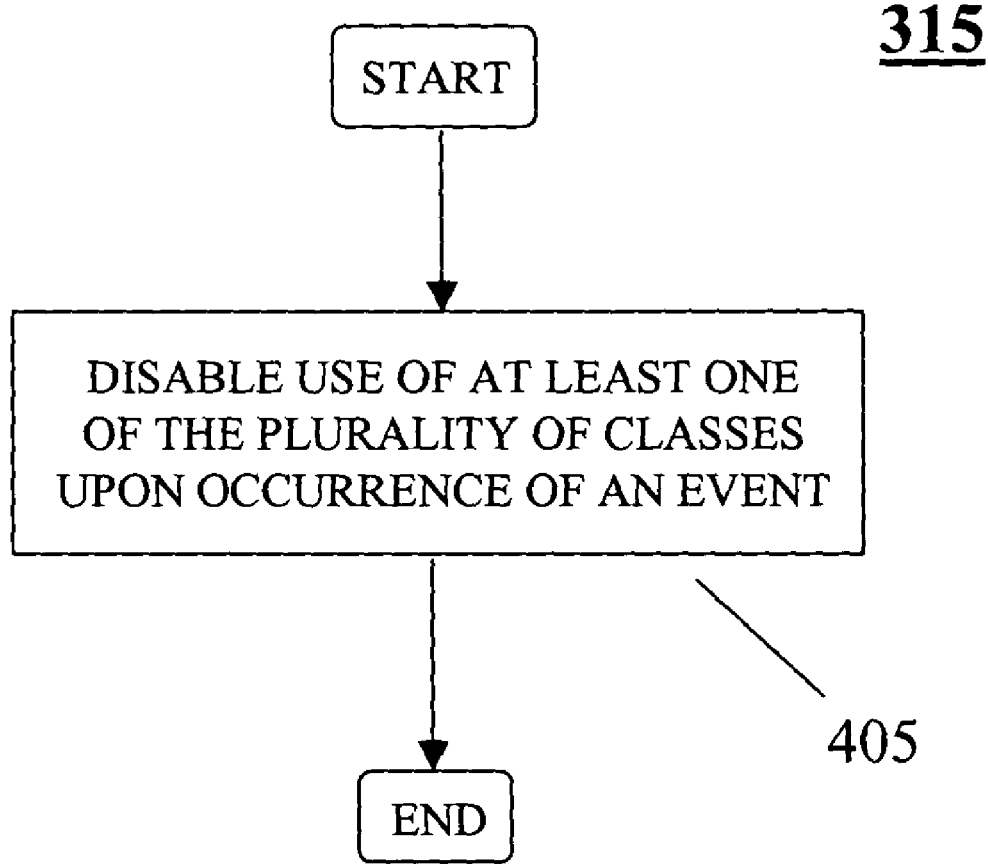
FIG. 4 is a flowchart illustrating steps for performing the step of assigning of FIG. 3, in accordance with an exemplary embodiment of the present invention.

FIG. 4 is a flowchart illustrating steps for performing step 315 of assigning of FIG. 3, in accordance with an exemplary embodiment of the present invention. In step 405 of FIG. 4, the use of at least one of the plurality of classes can be disabled upon occurrence of an event. The event can be any condition or state associated with a device, such as, for example, a communications link of a port of an Ethernet switch being down, or any other event, such as a collision associated with information communication, any status change or the like.

Figure 5:
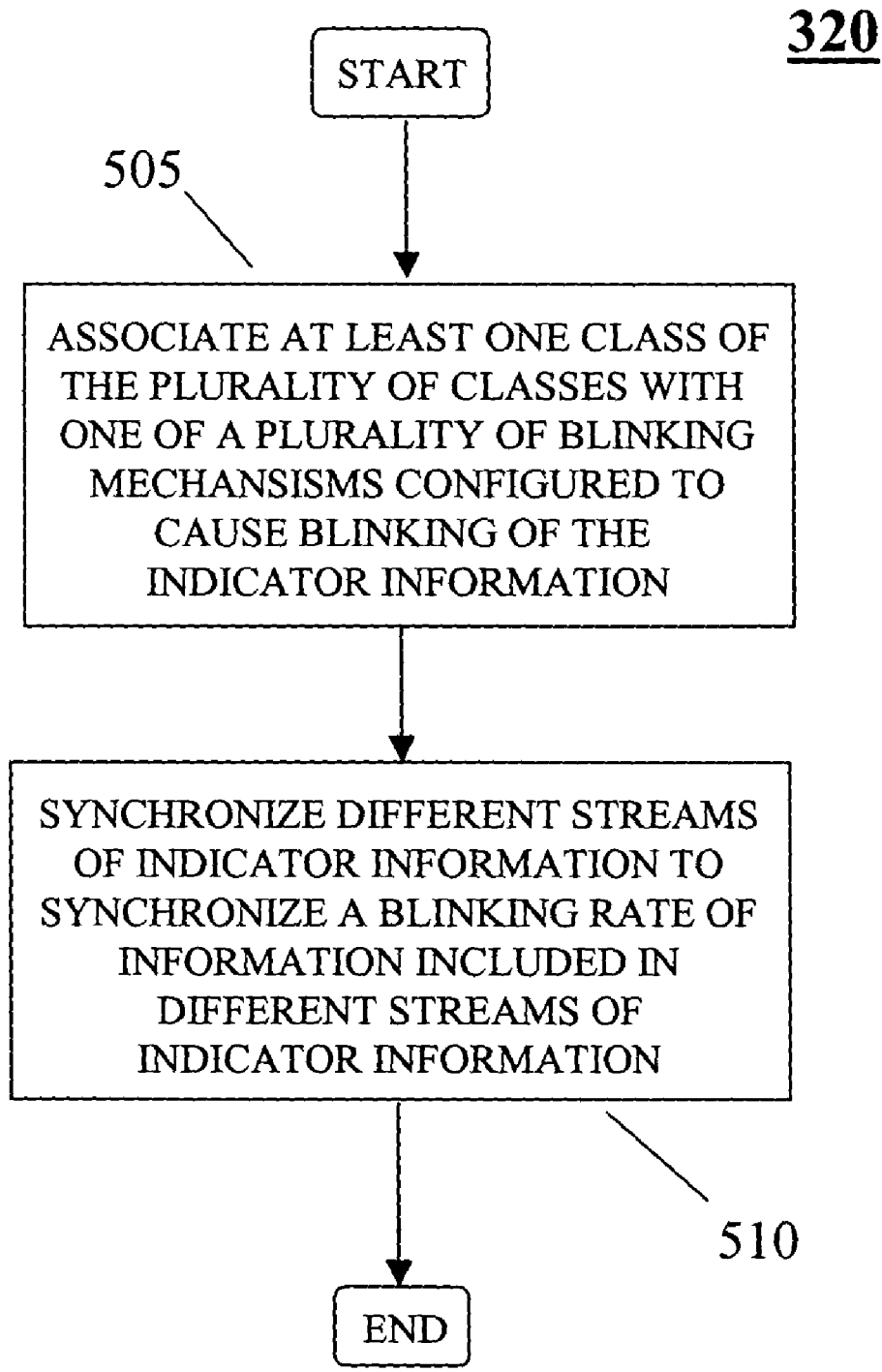
FIG. 5 is a flowchart illustrating steps for performing the step of altering of FIG. 3, in accordance with an exemplary embodiment of the present invention.

Referring again to FIG. 3, in step 320, at least one attribute of the class information for at least one of the plurality of classes can be altered. According to exemplary embodiments, the user can specify the at least one attribute to alter for the at least one of the plurality of classes. According to an exemplary embodiment, the attribute of the class information can be at least one of forced, inversion and blinking. For example, the forced attribute of the class information can substitute information specified by the user for the class information, while the inversion attribute can invert the class information. FIG. 5 is a flowchart illustrating steps for performing the step 320 of altering of FIG. 3, in accordance with an exemplary embodiment of the present invention. To perform blinking of the class information, in step 505 of FIG. 5, at least one class of the plurality of classes can be associated with one of a plurality of blinking mechanisms configured to cause blinking of the indicator information. Each of the plurality of blinking mechanism can be associated with a duty cycle and a rate. According to an exemplary embodiment, all classes associated with a blinking mechanism can blink at the duty cycle and rate specified for that blinking mechanism. In addition, if multiple streams of indicator information are being processed, and at least some of the information contained within those different streams is caused to blink, the blinking rates of the information contained within those different streams may need to be synchronized. Accordingly, in step 510, the blinking rate of information included in different streams of indicator information can be synchronized.

Referring again to FIG. 3, in step 325, class information from the plurality of classes can be combined into a plurality of combinational groups to customize the content of indicator information in each of the plurality of combinational groups. According to exemplary embodiments, the user can specify which of the plurality of classes to combine to form each of the plurality of combinational groups. According to an exemplary embodiment, each of the combinational groups can be formed according to a predetermined function. For example, the predetermined function can comprise a logical AND of a first value with a second value to generate a first result, a logical AND of a third value with a fourth value to generate a second result, and a logical OR of the first result with the second result to generate a combinational group.

Figure 6:
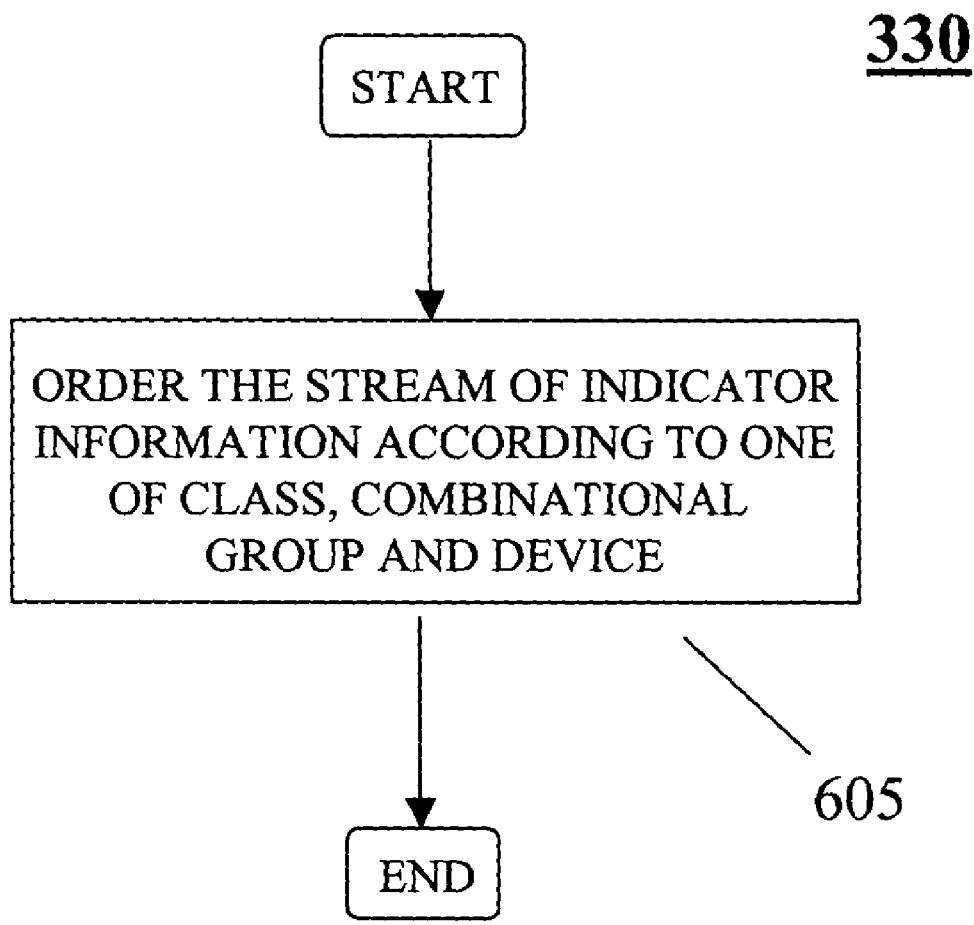
FIG. 6 is a flowchart illustrating steps for performing the step of modifying of FIG. 3, in accordance with an exemplary embodiment of the present invention.

To give the user control of, for example, the layout of the display of indicator information, in step 330, an order of indicator information from the plurality of combinational groups can be modified to generate a stream of indicator information. According to exemplary embodiments, the user can specify the order of information in the stream of indicator information to customize the display of the stream of indicator information. FIG. 6 is a flowchart illustrating steps for performing the step 330 of modifying of FIG. 3, in accordance with an exemplary embodiment of the present invention. In step 605 of FIG. 6, the stream of indicator information can be ordered according to class, combinational group or device, although the information can be ordered in any manner specified by the user.

Figure 7:
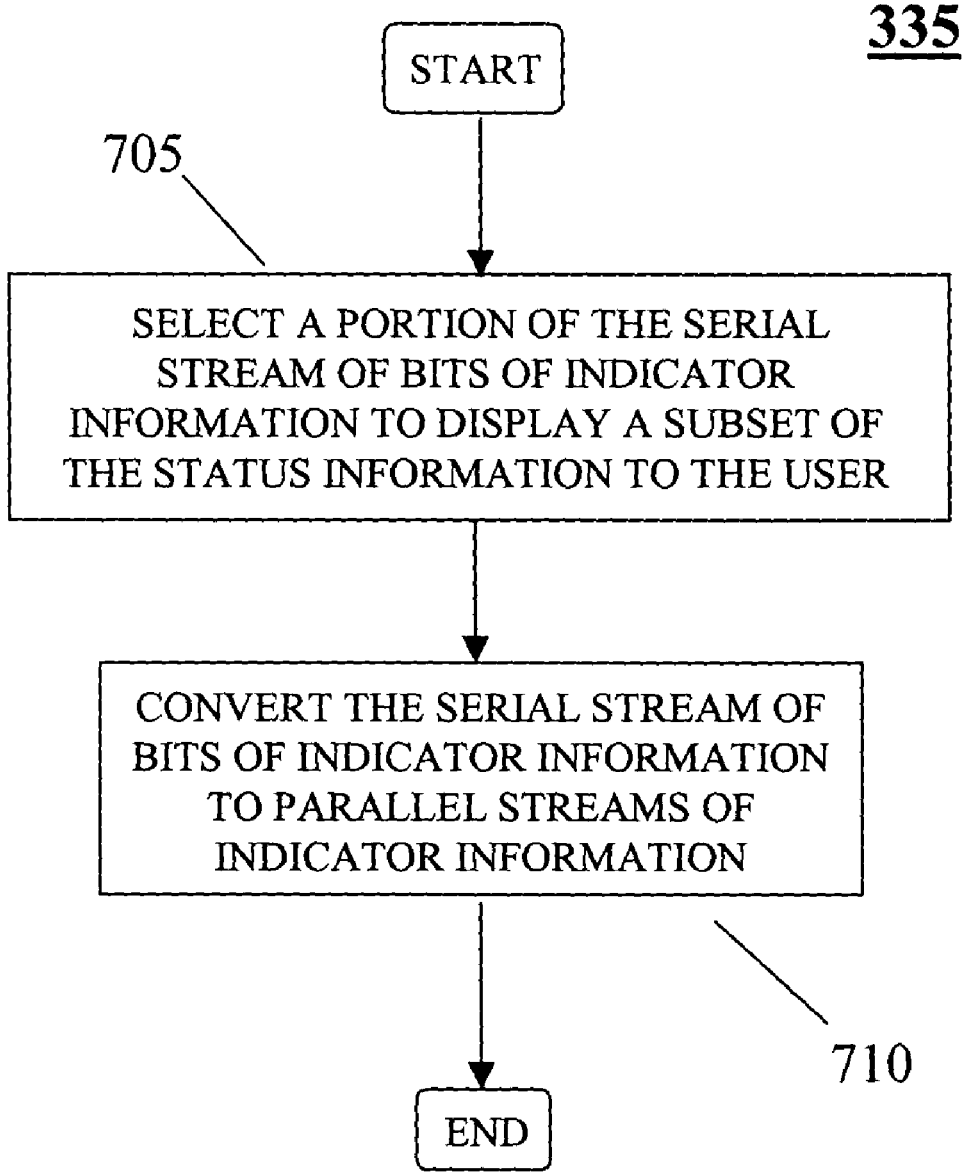
FIG. 7 is a flowchart illustrating steps for performing the step of generating of FIG. 3, in accordance with an exemplary embodiment of the present invention.
Figure 8:
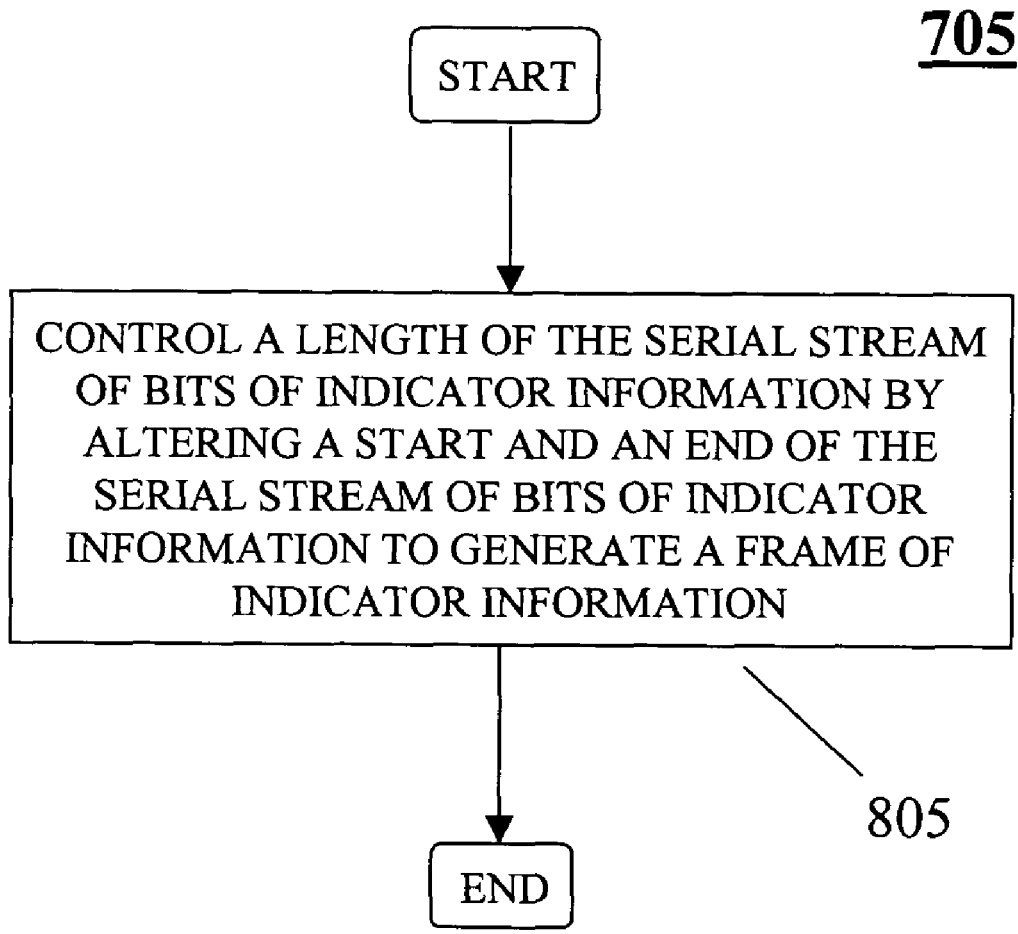
FIG. 8 is a flowchart illustrating steps for performing the step of selecting of FIG. 7, in accordance with an exemplary embodiment of the present invention.

Referring again to FIG. 3, in step 335, a serial stream of bits of indicator information can be generated from the stream of indicator information. FIG. 7 is a flowchart illustrating steps for performing the step 335 of generating of FIG. 3, in accordance with an exemplary embodiment of the present invention. To give the user further control of the layout of the display of the indicator information, in step 705, a portion of the serial stream of bits of indicator information can be selected to display a subset of the status information to the user. According to exemplary embodiments, the user can specify the portion of indicator information to select. FIG. 8 is a flowchart illustrating steps for performing the step 705 of selecting of FIG. 7, in accordance with an exemplary embodiment of the present invention. To perform the selection, in step 805 of FIG. 8, the length of the serial stream of bits of indicator information can be controlled by altering the start and the end of the serial stream of bits of indicator information to generate a frame of indicator information. According to an exemplary embodiment, the frame of indicator information can comprise a portion of indicator information included in the stream of indicator information. According to exemplary embodiments, the user can specify the start and the end of the serial stream of bits of indicator information to specify the portion of indicator information to select. In step 710 of FIG. 7, the serial stream of bits of indicator information can be converted to parallel streams of indicator information. According to an exemplary embodiment, the parallel streams of indicator information can be used for displaying the status information of the plurality of devices.

Referring again to FIG. 3, in step 340, the status information of the plurality of devices can be displayed to the user using the stream of indicator information. According to an exemplary embodiment, the stream of indicator information can be displayed to the user on a multiple element display to display the status of the plurality of devices to the users. For example, the display can be comprised of a plurality of individual LEDs. However, the display can be any type of display device that is capable of displaying indicator information to a user, such as a Liquid Crystal Display (LCD), any type of video or computer monitor, or any other type of display device.

The steps of a computer program as illustrated in FIGS. 3-8 for customizing indicator information for displaying status information to a user can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A system for customizing indicator information for displaying status information to a user, comprising:
a receiver for receiving status information from each of a plurality of devices,
wherein the receiver assigns the status information received from each of the plurality of devices to one of a plurality of classes to generate class information for each of the plurality of classes, wherein each of the plurality of classes is associated with a different characteristic of the plurality of devices;

an information stretcher for stretching the status information received from at least one of the plurality of devices by a predetermined amount;

a plurality of manipulators for altering at least one attribute of the class information for at least one of the plurality of classes;

a logical combiner for combining class information from the plurality of classes into a plurality of combinational groups to customize a content of indicator information in each of the plurality of combinational groups, wherein each of the plurality of combinational groups is formed according to a predetermined function;

an information sequencer for modifying an order of indicator information from the plurality of combinational groups to generate a stream of indicator information, wherein the order of information in the stream of indicator information is modified to customize a display of the stream of indicator information, wherein the stream of indicator information comprises a serial stream of bits of indicator information;

a serial-to-parallel converter for converting the serial stream of bits of indicator information to parallel streams of indicator information, wherein the parallel streams of indicator information are used for displaying the status information of the plurality of devices; and a display for displaying the status information of the plurality of devices to the user using the parallel streams of indicator information.

2. The system of claim 1, wherein an attribute of the class information includes at least one of forced, inversion and blinking.

3. The system of claim 2, wherein the attribute of the class information substitutes information specified by the user for the class information.

4. The system of claim 2, comprising:

a plurality of blinking mechanisms configured to cause blinking of the indicator information, each of the plurality of blinking mechanisms associated with a duty cycle and a rate, wherein at least one class of the plurality of classes is associated with one of the plurality of blinking mechanisms, and wherein all classes associated with a blinking mechanism blink at the duty cycle and rate specified for the blinking mechanism.

5. The system of claim 1, comprising:

a synchronizer for synchronizing different serial streams of bits of indicator information to synchronize a blinking rate of information included in different serial streams of bits of indicator information.

6. The system of claim 1, wherein the information sequencer orders the serial stream of bits of indicator information according to one of class, combinational group and device.

7. The system of claim 1, comprising:

a selector for controlling a length of the serial stream of bits of indicator information by altering a start and an end of the serial stream of bits of indicator information to generate a frame of bits of indicator information, wherein the frame of bits of indicator information selects a portion of the serial stream of bits of indicator information to display a subset of the status information to the user, and wherein the frame of bits of indicator information comprises a portion of indicator information included in the serial stream of bits of indicator information.

8. A system for customizing indicator information for displaying status information to a user, comprising:

means for receiving status information from each of a plurality of devices;

means for stretching the status information received from at least one of the plurality of devices by a predetermined amount;

means for assigning the status information received from each of the plurality of devices to one of a plurality of classes to generate class information for each of the plurality of classes, wherein each of the plurality of classes is associated with a different characteristic of the plurality of devices;

means for altering at least one attribute of the class information for at least one of the plurality of classes;

means for combining class information from the plurality of classes into a plurality of combinational groups to customize a content of indicator information in each of the plurality of combinational groups, wherein each of the plurality of combinational groups is formed according to a predetermined function;

means for modifying an order of indicator information from the plurality of combinational groups to generate a stream of indicator information, wherein the order of information in the stream of indicator information is modified to customize a display of the stream of indicator information, wherein the stream of indicator information comprises a serial stream of bits of indicator information;

means for converting the serial stream of bits of indicator information to parallel streams of indicator information, wherein the parallel streams of indicator information are used for displaying the status information of the plurality of devices; and means for displaying the status information of the plurality of devices to the user using the parallel streams of indicator information.

9. The system of claim 8, wherein an attribute of the class information includes at least one of forced, inversion and blinking.

10. The system of claim 9, wherein the attribute of the class information substitutes information specified by the user for the class information.

11. The system of claim 9, comprising:

plurality of means for blinking configured to cause blinking of the indicator information, each of the plurality of means for blinking associated with a duty cycle and a rate; and means for associating at least one class of the plurality of classes with one of the plurality of means for blinking, wherein all classes associated with means for blinking blink at the duty cycle and rate specified for the means for blinking.

12. The system of claim 8, comprising:

means for synchronizing different serial streams of bits of indicator information to synchronize a blinking rate of information included in different serial streams of bits of indicator information.

13. The system of claim 8, comprising:

means for ordering the serial stream of bits of indicator information according to one of class, combinational group and device.

14. The system of claim 8, comprising:
   means for controlling a length of the serial stream of bits of indicator information by altering a start and an end of the serial stream of bits of indicator information to generate a frame of bits of indicator information,
   wherein the frame of bits of indicator information selects a portion of the serial stream of bits of indicator information to display a subset of the status information to the user, and
   wherein the frame of bits of indicator information comprises a portion of indicator information included in the serial stream of bits of indicator information.

15. A system for customizing indicator information for displaying status information to a user, comprising:
   a receiver for receiving status information from each of a plurality of devices,
   wherein the receiver assigns the status information received from each of the plurality of devices to one of a plurality of classes to generate class information for each of the plurality of classes,
   wherein each of the plurality of classes is associated with a different characteristic of the plurality of devices;
   a plurality of manipulators for altering at least one attribute of the class information for at least one of the plurality of classes; and
   a logical combiner for combining class information from the plurality of classes into a plurality of combinational groups to customize a content of indicator information in each of the plurality of combinational groups,
   wherein each of the plurality of combinational groups is formed according to a predetermined function.

16. The system of claim 15, comprising:
   an information sequencer for modifying an order of indicator information from the plurality of combinational groups to generate a stream of indicator information,
   wherein the order of information in the stream of indicator information is modified to customize a display of the stream of indicator information.

17. The system of claim 16, wherein the information sequencer orders the stream of indicator information according to one of class, combinational group and device.

18. The system of claim 16, wherein the information sequencer comprises:
   a serializer for generating a serial stream of bits of indicator information from the stream of indicator information.

19. The system of claim 18, wherein the serializer comprises:
   a synchronizer for synchronizing different serial streams of bits of indicator information to synchronize a blinking rate of information included in different serial streams of bits of indicator information.

20. The system of claim 18, comprising:
   a serial-to-parallel converter for converting the serial stream of bits of indicator information to parallel streams of indicator information,
   wherein the parallel streams of indicator information are used for displaying the status information of the plurality of devices.

21. The system of claim 18, wherein the information sequencer comprises:
   a selector for selecting a portion of the serial stream of bits of indicator information to display a subset of the status information to the user.

22. The system of claim 21, wherein the selector controls a length of the serial stream of bits of indicator information by altering a start and an end of the serial stream of bits of indicator information to generate a frame of indicator information, and
   wherein the frame of indicator information comprises a portion of indicator information included in the serial stream of bits of indicator information.

23. The system of claim 15, comprising:
   a display for displaying the status information of the plurality of devices to the user using a stream of indicator information.

24. The system of claim 23, wherein the display comprises a multiple element display.

25. The system of claim 24, wherein the multiple element display comprises a plurality of individual light-emitting diodes (LEDs).

26. The system of claim 15, wherein the plurality of devices include ports of a communication device.

27. The system of claim 26, wherein the communication device includes a network switch.

28. The system of claim 27, wherein a characteristic of the plurality of devices includes at least one of a port speed, one of full duplex and half duplex, one of communications link up and down, port activity, port disabled, packet collision, and erroneous frame receiving.

29. The system of claim 15, comprising:
   an information stretcher for stretching the status information received from at least one of the plurality of devices by a predetermined amount.

30. The system of claim 15, wherein the receiver disables use of at least one of the plurality of classes upon occurrence of an event.

31. The system of claim 30, wherein the event comprises a communications link being down.

32. The system of claim 15, wherein an attribute of the class information includes at least one of forced, inversion and blinking.

33. The system of claim 32, comprising:
   a plurality of blinking mechanisms configured to cause blinking of the indicator information, each of the plurality of blinking mechanism associated with a duty cycle and a rate,
   wherein at least one class of the plurality of classes is associated with one of the plurality of blinking mechanisms, and
   wherein all classes associated with a blinking mechanism blink at the duty cycle and rate specified for the blinking mechanism.

34. The system of claim 15, wherein the attribute of the class information substitutes information specified by the user for the class information.

35. The system of claim 15, wherein the predetermined function comprises:
   a logical AND of a first value with a second value to generate a first result,
   a logical AND of a third value with a fourth value to generate a second result, and
   a logical OR of the first result with the second result to generate a combinational group.

36. A system for customizing indicator information for displaying status information to a user, comprising:
   a receiver means for receiving status information from each of a plurality of devices,
   wherein the receiver assigns the status information received from each of the plurality of devices to one of a plurality of classes to generate class information for each of the plurality of classes, wherein each of the plurality of classes is associated with a different characteristic of the plurality of devices;

a plurality of manipulator means for altering at least one attribute of the class information for at least one of the plurality of classes; and a logical combiner means for combining class information from the plurality of classes into a plurality of combinational groups to customize a content of indicator information in each of the plurality of combinational groups, wherein each of the plurality of combinational groups is formed according to a predetermined function.

37. The system of claim 36, comprising:

information sequencer means for modifying an order of indicator information from the plurality of combinational groups to generate a stream of indicator information, wherein the order of information in the stream of indicator information is modified to customize a display of the stream of indicator information.

38. The system of claim 37, wherein the information sequencer means orders the stream of indicator information according to one of class, combinational group and device.

39. The system of claim 37, wherein the information sequencer means comprises:

serializer means for generating a serial stream of bits of indicator information from the stream of indicator information.

40. The system of claim 39, wherein the serializer means comprises:

synchronizer means for synchronizing different serial streams of bits of indicator information to synchronize a blinking rate of information included in different serial streams of bits of indicator information.

41. The system of claim 39, comprising:

serial-to-parallel converter means for converting the serial stream of bits of indicator information to parallel streams of indicator information, wherein the parallel streams of indicator information are used for displaying the status information of the plurality of devices.

42. The system of claim 39, wherein the information sequencer means comprises:

selector means for selecting a portion of the serial stream of bits of indicator information to display a subset of the status information to the user.

43. The system of claim 42, wherein the selector means controls a length of the serial stream of bits of indicator information by altering a start and an end of the serial stream of bits of indicator information to generate a frame of indicator information, and wherein the frame of indicator information comprises a portion of indicator information included in the serial stream of bits of indicator information.

44. The system of claim 36, comprising:

display means for displaying the status information of the plurality of devices to the user using a stream of indicator information.

45. The system of claim 36, wherein the plurality of devices include ports of a communication device.

46. The system of claim 45, wherein the communication device includes a network switch.

47. The system of claim 46, wherein a characteristic of the plurality of devices includes at least one of a port speed, one of full duplex and half duplex, one of communications link up and down, port activity, port disabled, packet collision, and erroneous frame receiving.

48. The system of claim 36, comprising:

information stretcher means for stretching the status information received from at least one of the plurality of devices by a predetermined amount.

49. The system of claim 36, wherein the receiver means disables use of at least one of the plurality of classes upon occurrence of an event.

50. The system of claim 49, wherein the event comprises a communications link being down.

51. The system of claim 36, wherein an attribute of the class information includes at least one of forced, inversion and blinking.

52. The system of claim 51, wherein the attribute of the class information substitutes information specified by the user for the class information.

53. The system of claim 36, comprising:

plurality of blinking means configured to cause blinking of the indicator information, each of the plurality of blinking means associated with a duty cycle and a rate, wherein at least one class of the plurality of classes is associated with one of the plurality of blinking means, and wherein all classes associated with blinking means blink at the duty cycle and rate specified for the blinking means.

54. The system of claim 36, wherein the predetermined function comprises:

a logical AND of a first value with a second value to generate a first result, a logical AND of a third value with a fourth value to generate a second result, and a logical OR of the first result with the second result to generate a combinational group.

55. A method of customizing indicator information for displaying status information to a user, comprising the steps of:

receiving status information from each of a plurality of devices;

assigning the status information received from each of the plurality of devices to one of a plurality of classes to generate class information for each of the plurality of classes, wherein each of the plurality of classes is associated with a different characteristic of the plurality of devices;

altering at least one attribute of the class information for at least one of the plurality of classes; and combining class information from the plurality of classes into a plurality of combinational groups to customize a content of indicator information in each of the plurality of combinational groups, wherein each of the plurality of combinational groups is formed according to a predetermined function.

56. The method according to claim 55, comprising the step of:

modifying an order of indicator information from the plurality of combinational groups to generate a stream of indicator information, wherein the order of information in the stream of indicator information is modified to customize a display of the stream of indicator information.

57. The method of claim 56, wherein the step of modifying comprises the step of:

synchronizing different streams of indicator information to synchronize a blinking rate of information included in different streams of indicator information.

58. The method of claim 56, wherein the step of modifying comprises the step of:
ordering the stream of indicator information according to one of class, combinational group and device.

59. The method of claim 56, comprising the step of:
generating a serial stream of bits of indicator information from the stream of indicator information.

60. The method of claim 59, wherein the step of generating comprises the step of:
converting the serial stream of bits of indicator information to parallel streams of indicator information,
wherein the parallel streams of indicator information are used for displaying the status information of the plurality of devices.

61. The method of claim 59, wherein the step of generating comprises the step of:
selecting a portion of the serial stream of bits of indicator information to display a subset of the status information to the user.

62. The method of claim 61, wherein step of selecting comprises the step of:
controlling a length of the serial stream of bits of indicator information by altering a start and an end of the serial stream of bits of indicator information to generate a frame of indicator information,
wherein the frame of indicator information comprises a portion of indicator information included in the stream of indicator information.

63. The method of claim 55, comprising the step of:
displaying the status information of the plurality of devices to the user using a stream of indicator information.

64. The method of claim 63, wherein the stream of indicator information is displayed to the user on a multiple element display to display the status of the plurality of devices to the user.

65. The method of claim 64, wherein the multiple element display includes a plurality of individual light-emitting diodes (LEDs).

66. The method of claim 55, wherein the plurality of devices include ports of a communication device.

67. The method of claim 66, wherein the communication device includes a network switch.

68. The method of claim 67, wherein a characteristic of the plurality of devices includes at least one of a port speed, one of full duplex and half duplex, one of communications link up and down, port activity, port disabled, packet collision, and erroneous frame receiving.

69. The method of claim 55, comprising the step of:
stretching the status information received from at least one of the plurality of devices by a predetermined amount.

70. The method of claim 55, comprising the step of:
disabling use of at least one of the plurality of classes upon occurrence of an event.

71. The method of claim 70, wherein the event comprises a communications link being down.

72. The method of claim 55, wherein an attribute of the class information includes at least one of forced, inversion and blinking.

73. The method of claim 72, wherein the attribute of the class information substitutes information specified by the user for the class information.

74. The method of claim 72, comprising the step of:
associating at least one class of the plurality of classes with one of a plurality of blinking mechanisms configured to cause blinking of the indicator information, each of the plurality of blinking mechanism associated with a duty cycle and a rate, and wherein all classes associated with a blinking mechanism blink at the duty cycle and rate specified for the blinking mechanism.

75. The method of claim 55, wherein the predetermined function comprises:
a logical AND of a first value with a second value to generate a first result,
a logical AND of a third value with a fourth value to generate a second result, and
a logical OR of the first result with the second result to generate a combinational group.

76. A system for customizing indicator information for displaying status information to a user, comprising:
a memory that stores the steps of a computer program to:
receive status information from each of a plurality of devices;
assign the status information received from each of the plurality of devices to one of a plurality of classes to generate class information for each of the plurality of classes,
wherein each of the plurality of classes is associated with a different characteristic of the plurality of devices;
alter at least one attribute of the class information for at least one of the plurality of classes; and
combine class information from the plurality of classes into a plurality of combinational groups to customize a content of indicator information in each of the plurality of combinational groups,
wherein each of the plurality of combinational groups is formed according to a predetermined function; and
a processor for accessing the memory to execute the computer program.

77. The system of claim 76, wherein the memory stores steps of a computer program:
to modify an order of indicator information from the plurality of combinational groups to generate a stream of indicator information,
wherein the order of information in the stream of indicator information is modified to customize a display of the stream of indicator information.

78. The system of claim 77, wherein the memory stores steps of a computer program:
to synchronize different streams of indicator information to synchronize a blinking rate of information included in different streams of indicator information.

79. The system of claim 77, wherein the memory stores steps of a computer program:
to order the stream of indicator information according to one of class, combinational group and device.

80. The system of claim 77, wherein the memory stores steps of a computer program:
to generate a serial stream of bits of indicator information from the stream of indicator information.

81. The system of claim 80, wherein the memory stores steps of a computer program:
to convert the serial stream of bits of indicator information to parallel streams of indicator information,
wherein the parallel streams of indicator information are used for displaying the status information of the plurality of devices.

82. The system of claim 80, wherein the memory stores the steps of a computer program:
to select a portion of the serial stream of bits of indicator information to display a subset of the status information to the user.

83. The system of claim 82, wherein the memory stores steps of a computer program:
to control a length of the serial stream of bits of indicator information by altering a start and an end of the serial stream of bits of indicator information to generate a frame of indicator information,
wherein the frame of indicator information comprises a portion of indicator information included in the stream of indicator information.

84. The system of claim 76, wherein the memory stores steps of a computer program:
to display the status information of the plurality of devices to the user using a stream of indicator information.

85. The system of claim 84, wherein the stream of indicator information is displayed to the user on a multiple element display to display the status of the plurality of devices to the user.

86. The system of claim 85, wherein the multiple element display includes a plurality of individual light-emitting diodes (LEDs).

87. The system of claim 76, wherein the plurality of devices include ports of a communication device.

88. The system of claim 87, wherein the communication device includes a network switch.

89. The system of claim 88, wherein a characteristic of the plurality of devices includes at least one of a port speed, one of full duplex and half duplex, one of communications link up and down, port activity, port disabled, packet collision, and erroneous frame receiving.

90. The system of claim 76, wherein the memory stores steps of a computer program:
to stretch the status information received from at least one of the plurality of devices by a predetermined amount.

91. The system of claim 76, wherein the memory stores steps of a computer program:
to disable use of at least one of the plurality of classes upon occurrence of an event.

92. The system of claim 91, wherein the event comprises a communications link being down.

93. The system of claim 76, wherein an attribute of the class information includes at least one of forced, inversion and blinking.

94. The system of claim 93, wherein the attribute of the class information substitutes information specified by the user for the class information.

95. The system of claim 93, wherein the memory stores steps of a computer program:
to associate at least one class of the plurality of classes with one of a plurality of blinking mechanisms configured to cause blinking of the indicator information, each of the plurality of blinking mechanism associated with a duty cycle and a rate, and wherein all classes associated with a blinking mechanism blink at the duty cycle and rate specified for the blinking mechanism.

96. The system of claim 76, wherein the predetermined function comprises:
a logical AND of a first value with a second value to generate a first result,
a logical AND of a third value with a fourth value to generate a second result, and
a logical OR of the first result with the second result to generate a combinational group.

97. A system for customizing indicator information for displaying status information to a user, comprising:
a memory means for storing the steps of a computer program to:
receive status information from each of a plurality of devices;
assign the status information received from each of the plurality of devices to one of a plurality of classes to generate class information for each of the plurality of classes,
wherein each of the plurality of classes is associated with a different characteristic of the plurality of devices;
alter at least one attribute of the class information for at least one of the plurality of classes; and
combine class information from the plurality of classes into a plurality of combinational groups to customize a content of indicator information in each of the plurality of combinational groups,
wherein each of the plurality of combinational groups is formed according to a predetermined function; and
a processor means for accessing the memory to execute the computer program.

98. The system of claim 97, wherein the memory means stores steps of a computer program to:
to modify an order of indicator information from the plurality of combinational groups to generate a stream of indicator information,
wherein the order of information in the stream of indicator information is modified to customize a display of the stream of indicator information.

99. The system of claim 98, wherein the memory means stores steps of a computer program:
to synchronize different streams of indicator information to synchronize a blinking rate of information included in different streams of indicator information.

100. The system of claim 98, wherein the memory means stores steps of a computer program:
to order the stream of indicator information according to one of class, combinational group and device.

101. The system of claim 98, wherein the memory means stores steps of a computer program:
to generate a serial stream of bits of indicator information from the stream of indicator information.

102. The system of claim 101, wherein the memory means stores steps of a computer program:
to convert the serial stream of bits of indicator information to parallel streams of indicator information,
wherein the parallel streams of indicator information are used for displaying the status information of the plurality of devices.

103. The system of claim 101, wherein the memory means stores the steps of a computer program:
to select a portion of the serial stream of bits of indicator information to display a subset of the status information to the user.

104. The system of claim 103, wherein the memory means stores steps of a computer program to:
to control a length of the serial stream of bits of indicator information by altering a start and an end of the serial stream of bits of indicator information to generate a frame of indicator information,
wherein the frame of indicator information comprises a portion of indicator information included in the stream of indicator information.

105. The system of claim 97, wherein the memory means stores steps of a computer program:
to display the status information of the plurality of devices to the user using a stream of indicator information.

106. The system of claim 105, wherein the stream of indicator information is displayed to the user on a multiple element display to display the status of the plurality of devices to the user.

107. The system of claim 106, wherein the multiple element display includes a plurality of individual light-emitting diodes (LEDs).

108. The system of claim 97, wherein the plurality of devices include ports of a communication device.

109. The system of claim 108, wherein the communication device includes a network switch.

110. The system of claim 109, wherein a characteristic of the plurality of devices includes at least one of a port speed, one of full duplex and half duplex, one of communications link up and down, port activity, port disabled, packet collision, and erroneous frame receiving.

111. The system of claim 97, wherein the memory means stores steps of a computer program:
to stretch the status information received from at least one of the plurality of devices by a predetermined amount.

112. The system of claim 97, wherein the memory means stores steps of a computer program:
to disable use of at least one of the plurality of classes upon occurrence of an event.

113. The system of claim 112, wherein the event comprises a communications link being down.

114. The system of claim 97, wherein an attribute of the class information includes at least one of forced, inversion and blinking.

115. The system of claim 114, wherein the attribute of the class information substitutes information specified by the user for the class information.

116. The system of claim 114, wherein the memory means stores steps of a computer program:
to associate at least one class of the plurality of classes with one of a plurality of blinking mechanisms configured to cause blinking of the indicator information, each of the plurality of blinking mechanism associated with a duty cycle and a rate, and wherein all classes associated with a blinking mechanism blink at the duty cycle and rate specified for the blinking mechanism.

117. The system of claim 97, wherein the predetermined function comprises:
a logical AND of a first value with a second value to generate a first result,
a logical AND of a third value with a fourth value to generate a second result, and
a logical OR of the first result with the second result to generate a combinational group.

118. A computer program stored on a non-transitory computer-readable medium and executed by a processor, the computer program for customizing indicator information for displaying status information to a user by performing the steps of:
assigning the status information from each of a plurality of devices to one of a plurality of classes to generate class information for each of the plurality of classes,
wherein each of the plurality of classes is associated with a different characteristic of the plurality of devices;
altering at least one attribute of the class information for at least one of the plurality of classes; and
combining class information from the plurality of classes into a plurality of combinational groups to customize a content of indicator information in each of the plurality of combinational groups,
wherein each of the plurality of combinational groups is formed according to a predetermined function.

119. The computer program of claim 118, wherein the computer program performs the step of:
modifying an order of indicator information from the plurality of combinational groups to generate a stream of indicator information,
wherein the order of information in the stream of indicator information is modified to customize a display of the stream of indicator information.

120. The computer program of claim 119, wherein the computer program performs the step of:
synchronizing different streams of indicator information to synchronize a blinking rate of information included in different streams of indicator information.

121. The computer program of claim 119, wherein the computer program performs the step of:
ordering the stream of indicator information according to one of class, combinational group and device.

122. The computer program of claim 119, wherein the computer program performs the step of:
generating a serial stream of bits of indicator information from the stream of indicator information.

123. The computer program of claim 122, wherein the computer program performs the step of:
converting the serial stream of bits of indicator information to parallel streams of indicator information,
wherein the parallel streams of indicator information are used for displaying the status information of the plurality of devices.

124. The computer program of claim 122, wherein the computer program performs the step of:
selecting a portion of the serial stream of bits of indicator information to display a subset of the status information to the user.

125. The computer program of claim 124, wherein the computer program performs the step of:
controlling a length of the serial stream of bits of indicator information by altering a start and an end of the serial stream of bits of indicator information to generate a frame of indicator information,
wherein the frame of indicator information comprises a portion of indicator information included in the stream of indicator information.

126. The computer program of claim 118, wherein the computer program performs the step of:
displaying the status information of the plurality of devices to the user using a stream of indicator information.

127. The computer program of claim 118, wherein the plurality of devices include ports of a communication device.

128. The computer program of claim 127, wherein the communication device includes a network switch.

129. The computer program of claim 128, wherein a characteristic of the plurality of devices includes at least one of a port speed, one of full duplex and half duplex, one of communications link up and down, port activity, port disabled, packet collision, and erroneous frame receiving.

130. The computer program of claim 118, wherein the computer program performs the step of:
stretching the status information received from at least one of the plurality of devices by a predetermined amount.

131. The computer program of claim 118, wherein the computer program performs the step of:
disabling use of at least one of the plurality of classes upon occurrence of an event.

132. The computer program of claim 131, wherein the event comprises a communications link being down.

133. The computer program of claim 118, wherein an attribute of the class information includes at least one of forced, inversion and blinking.

134. The computer program of claim 133, wherein the attribute of the class information substitutes information specified by the user for the class information.

135. The computer program of claim 133, wherein the computer program performs the step of:

associating at least one class of the plurality of classes with one of a plurality of blinking mechanisms configured to cause blinking of the indicator information, each of the plurality of blinking mechanism associated with a duty cycle and a rate, and wherein all classes associated with a blinking mechanism blink at the duty cycle and rate specified for the blinking mechanism.

136. The computer program of claim 118, wherein the predetermined function comprises:

a logical AND of a first value with a second value to generate a first result, a logical AND of a third value with a fourth value to generate a second result, and a logical OR of the first result with the second result to generate a combinational group.

* * * * *